MAGNETIC RECORDER CONTROL SYSTEM

Original Filed April 13, 1953

4 Sheets-Sheet 1

INVENTOR.
JAMES D. CONFELD

BY

ATTORNEY

MAGNETIC RECORDER CONTROL SYSTEM

MAGNETIC RECORDER CONTROL SYSTEM

Original Filed April 13, 1953 4 Sheets-Sheet 3

MAGNETIC RECORDER CONTROL SYSTEM

Original Filed April 13, 1953 4 Sheets-Sheet 4

1

3,251,045
MAGNETIC RECORDER CONTROL SYSTEM
James D. Confeld, Rochester, N.Y., assignor to General Dynamics Corporation, Rochester, N.Y., a corporation of Delaware
Original application Apr. 13, 1953, Ser. No. 348,202, now Patent No. 2,886,642, dated May 12, 1959. Divided and this application Oct. 2, 1958, Ser. No. 764,975
6 Claims. (Cl. 340—174.1)

Figures 1, 5:
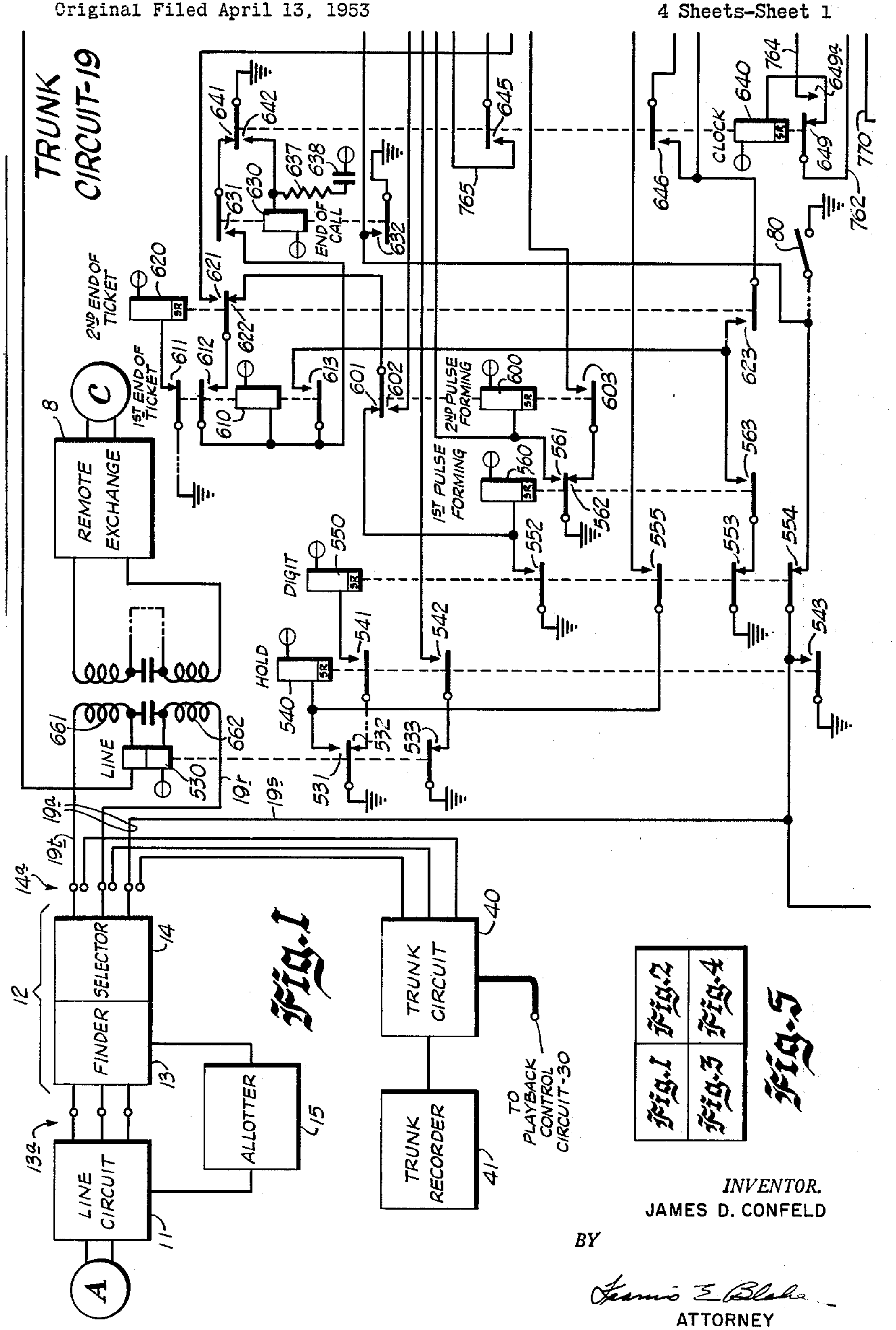

This invention relates to a data handling system and, more particularly, to such a system including one or more magnetic storage units, digit entry means, and common output means to which the magnetic storage units are selectively connected. This application is a division of a copending application of Frank A. Morris et al., Serial No. 348,202, filed April 13, 1953, now Patent No. 2,886,642.

The above identified patent discloses an automatic toll ticketing system in which items of information pertaining to toll calls are automatically collected and stored in magnetic storage devices individual to each of a plurality of trunk circuits that are used to extend toll calls. This data is subsequently transferred from the storage devices, preferably at selected times of the day, to a common output recorder or printer under the control of selecting means which seize each of the individual storage devices and render the seized storage device effective to transmit the stored data to the output recorder. During the data collecting and storing operation, certain items of information, such as the designation of the calling and called subscribers, are entered into the storage device, which preferably includes a movable magnetic storage element, under the control of a manually actuated telephone dialing device. Other items of information are stored on the magnetic element under the control of registers in which are stored fixed items of information, such as the date and time of placing the call. During the playback operation, the magnetically stored information is reproduced and transferred to intermediate electronic storage devices, preferably comprising counting chains, from which the information is subsequently derived and recorded in either direct or translated form.

One object of the present invention is to provide a new and improved data handling system using one or more magnetic storage units.

Another object is to provide a data handling system including a plurality of separate magnetic storage units with individually associated digit entry means and a common digit utilizing means that is connected to selected ones of the storage units to receive the stored information.

Another object is to provide a data handling system including a plurality of magnetic storage units, each capable of storing digital data, which are selectively seized and rendered effective to supply stored digital data to a common output means in accordance with the idle or busy condition of the individual storage units.

A further object is to provide a data handling system having a plurality of individual magnetic storage units with a common drive means which is placed in operation wherever stored data is to be reproduced and selected means for rendering the drive means effective to drive a magnetic element in a selected one of the units.

Another object is to provide a data handling system including a magnetic storage unit in which a data bearing magnetic member is returned to a normal position when the storage unit is seized at the beginning of a playback operation and in which transducing means disposed adjacent the member are then rendered effective to reproduce the stored data.

A further object is to provide a data handling system including a magnetic storage unit having a magnetic member which is first moved under the control of a storage unit selecting means when the unit is seized and which is thereafter moved under the control of a utilizing means to which the seized storage unit is connected.

Another object is to provide a plurality of magnetic storage units having individually associated digit entry means which are rendered effective to store digital data in the units in accordance with the idle or busy condition thereof.

In accordance with these and many other objects, an embodiment of the present invention comprises a telephone system having a plurality of trunk circuits, each of which is provided with an individually connected trunk recorder including an endless loop of magnetic tape that can be driven either step-by-step or continuously. A pair of transducing heads disposed adjacent transversely spaced portions of the tape define two separate channels for receiving digital and control information. A third transducing head extending across the entire width of the tape provides a means for erasing the tape. When a toll call is to be extended, an idle one of the trunk circuits is selected by digit responsive selecting means and the selected trunk circuit is prepared for recording items of information in the connected trunk recorder.

The prepared trunk circuit is then operated by manually dialed digits or automatically transmitted signals representing various items of information pertaining to a call to record this information on one of the channels of the magnetic tape as a series of groups of pulses, each group including a number of pulses proportional to the value of the digit to be recorded. The trunk or control circuit also operates to automatically record a control signal on the other channel of the magnetic tape following each of the groups of digit representing pulses, thereby to separate successive digits on the tape. When the connection is released, the trunk circuit records an end-of-call signal on the tape following the digital information pertaining to the preceding toll call. During the data recording operation, the magnetic tape is advanced a single step following the recording of each of the control and digit representing pulses.

When printed tickets or permanent records of the items of information stored in the plurality of separate trunk recorders are to be made, a playback control circuit is placed in operation, either manually or at selected times of day, so that a selecting switch forming a part of the playback control circuit searches for and seizes each of the idle trunk recorders in sequence. When an idler trunk recorder is seized, the associated trunk circuit or digit entry means is rendered busy to prevent use of the trunk recorder for storing information, and the playback control circuit operates the continuous drive means in the trunk recorder to continuously advance the magnetic tape therein to a normal or home position in which the heads are positioned immediately preceding the items of information stored thereon. When the tape is returned to this normal position, the transducing heads are cut through to a data or digit utilizing means that is common to all of the trunk recorder, the control over the operation of the drive means in the seized trunk recorder is transferred to the digit utilizing means, and circuits are prepared for energizing the erase head so that the magnetic tape in the seized trunk recorder is erased as the information is reproduced and transmitted to the digit utilizing means. Thereafter, the magnetic tape is continuously advanced relative to the transducing heads so that the digit representing signals are reproduced and transmitted in sequence to a plurality of digit receiving elements forming a part of the data utilizing means under the control of the reproduced control signals. As soon as all of the items of information pertaining to a single call has been transmitted to the utilizing means, the

2 movement of the tape is arrested until such time as the previously reproduced signals have been used and cleared from the digit receiving elements. Following the playback of all of the information stored on the magnetic tape in the seized trunk recorder, this tape, which is now erased, is restored to its normal position and the selecting means in the playback control circuit seizes the next idler trunk recorder. Following the playback of all of the trunk recorders, the playback equipment is restored to a normal condition.

Many other objects and advantages of the present invention will be apparent from the following detailed description when considered in conjunction with the drawings wherein:

FIGS. 1–4 illustrate the details of a data handling system embodying the present invention; and FIG. 5 is a block diagram indicating the manner in which FIGS. 1–4 are positioned adjacent to each other to form a complete circuit diagram.

Referring now more specifically to the drawings, when a toll call is to be extended from a calling substation A to a called substation C, going "off-hook" extends the calling loop circuit from the substation A to a line circuit 11 and places an allotter 15 in operation so that a link circuit, such as a link circuit 12, is seized. A finder 13 in the link circuit 12 is placed in operation so that a switch 13*a* searches for and seizes the line circuit 11, thereby extending the calling loop circuit to a selector 14 that also forms a part of the link 12. The subscriber at the substation A then dials an access digit representing the desired remote exchange, such as an exchange 8 in which the called substation C is located. In response to the dialing of this digit, the selector 14 advances the wipers of a selector switch 14*a* to the proper contact or bank level and then searches over this level to find an idle trunk circuit extending to the remote exchange 8.

Assuming that a trunk circuit 19 (FIGS. 1 and 2) is in an idle condition, this trunk circuit is seized and is conditioned to provide a digit entry means for recording digit representing and controls signals on an endless loop of magnetic tape in a trunk recorder 25 (FIG. 2) that is individually connected to the circuit 19. The first items of information stored in the trunk recorder 25 are two groups of digits representing the designations of the calling substation A and the called substation C. Each of the digits in these designations is recorded on the magnetic tape in the trunk recorder 25 in the form of a group of digit representing or mark pulses proportional to the value of the digit to be stored. The trunk circuit 19 also automatically records a control or space pulse on the magnetic tape in the recorder 25 following each group of digit representing pulse to effectively separate successive items of digital information. The successively recorded mark and space pulses are spaced from each other by advancing the magnetic tape in a single step following each recording operation. Following the recording of the line designating information, the trunk circuit 19 stores a series of mark pulses followed by a space pulse representing the length of the call and then places a clock-calendar circuit 27 and a scanning circuit 28 in operation. The clock-calendar circuit 27 comprises a plurality of registers continuously adjusted to settings representing instant date and time, and the scanning circuit 28 comprises a sender controlled by the registers in the circuit 27 for supplying seven groups of mark pulses separated by space pulses to the recorder 25 representing the date on which and the time at which the call is terminated. Following the completion of the recording of this information, an end-of-call signal is recorded on the magnetic tape, and the trunk circuit 19 is restored to a normal condition in which is capable of being seized to again control the entry of digital information into the trunk recorder 25 pertaining to a toll call.

Although only the trunk circuit 19 and the connected trunk recorder 25 are illustrated in detail in the drawings, the selector 14 has access to a number of similar trunk circuits, such as a circuit 40, which extend to the remote office 8 or other remote offices and which are each provided with an individual trunk recorder, such a recorder 41. Thus, each of these other trunk circuits provides means for entering digital information into the connected trunk recorder under the control of digits dialed at the calling substation or under the control of the common digit storing and sending means provided by the clock-calendar circuit 27 and the scanning circuit 28.

When the items of information stored in the plurality of magnetic storage units or trunk recorders, such as the trunk recorder 25, is to be played back to provide permanent records of the items of information pertaining to the toll call, a playback control circuit 30 (FIGS. 3 and 4) is placed in operation, either manually or at a selected time of day under the control of the clock-calendar circuit 27, so that switching means forming a part of the playback control circuit 30 search for and seize, in sequence, the idle trunk recorders and their associated trunk circuits. Assuming that the trunk circuit 19 and its connected recorder 25 are in an idle condition, the playback control circuit 30 seizes the trunk recorder 25 and advances the endless loop of magnetic tape therein to a normal or home position in which a pair of transducing heads are positioned immediately preceding the first items of stored information. At this time, an erasing head in the trunk recorder 25 is rendered effective to erase the magnetic tape and the transducing heads are connected to mark pulse amplifying means 31 and 33 and space pulse amplifying means 32 and 34. Further, the control over the continuous tape drive means in the trunk recorder 25 is transferred from the playback control circuit 30 to a printing control circuit 35. When a plurality of electronic register 38 for storing the toll call data and a duration register and computer 39 have been reset or are in a condition to receive the items of information stored in the trunk recorder 25, the printing control circuit 35 initiates movement of the magnetic tape in the recorder 25 so that the items of information and the control signals stored therein pertaining to the first call are reproduced and transmitted to the mark and space pulse amplifiers 31–34. The digit representing signals or mark pulses supplied to the amplifiers 31 and 33 are applied to a conductor 2080 that is connected in common to the inputs to all of the registers 38 and computer 39. The control signals or space pulses from the amplifiers 32 and 34 are applied by a conductor 2070 to a steering circuit 37. This circuit comprises a counting chain for supplying each of the registers 38 and the computer 39 with enabling or an input gating voltage in sequence. Thus, since each of the space or control pulses separates successive groups of mark or digit representing pulses, only a single one of the registers 38 or the computer 39 is conditioned to receive mark pulse information at any given time.

Following the storage of all of the items of information relating to a single call, the transmission of the reproduced end-of-call signal from the seized trunk recorder 25 operates the printing control circuit 35 so that the movement of the tape in the recorder 25 is interrupted and the items of information stored in the registers 38 and the computer 39 are transferred to a printer 36 to produce a printed record. Following the printing of the stored items of information and the clearing of the registers 38 and the computer 39, the printing control circuit 35 again starts movement of the magnetic tape in the trunk recorder 25 so that the items of information pertaining to the next toll call are transmitted to and stored in the registers 38 and the computer 39.

This operation continues until such time as all of the items of information stored in the trunk recorder 25 have been reproduced, the tape being erased concurrently therewith. When the tape is returned to its normal home position, the playback control circuit 30 operates the switching means therein to release the trunk circuit 19 and the trunk recorder 25 and to seize the next idle magnetic storage unit. This operation continues until all of the magnetic storage units or trunk recorders to which the control circuit 30 has access have been played back. At this time, the playback and recording facilities are restored to a normal condition.

In the event that one of the trunk recorders, such as the recorder 25, becomes filled with items of information, an emergency start condition is established in the trunk circuit 19 which prevents its seizure from a calling substation. This emergency start condition places the playback control circuit 30 in operation to immediately reproduce the items of information stored on the filled tape so that this tape can be erased and the associated trunk circuit 19 restored to an operating condition. In response to the establishment of this emergency start condition, the playback control circuit 30 operates the stepping switch to advance over all of the magnetic storage units until the filled storage unit in the emergency playback condition is located. Following the seizure of this magnetic storage unit, the items of information stored therein are immediately played back and recorded by the printer 36.

Figure 2:
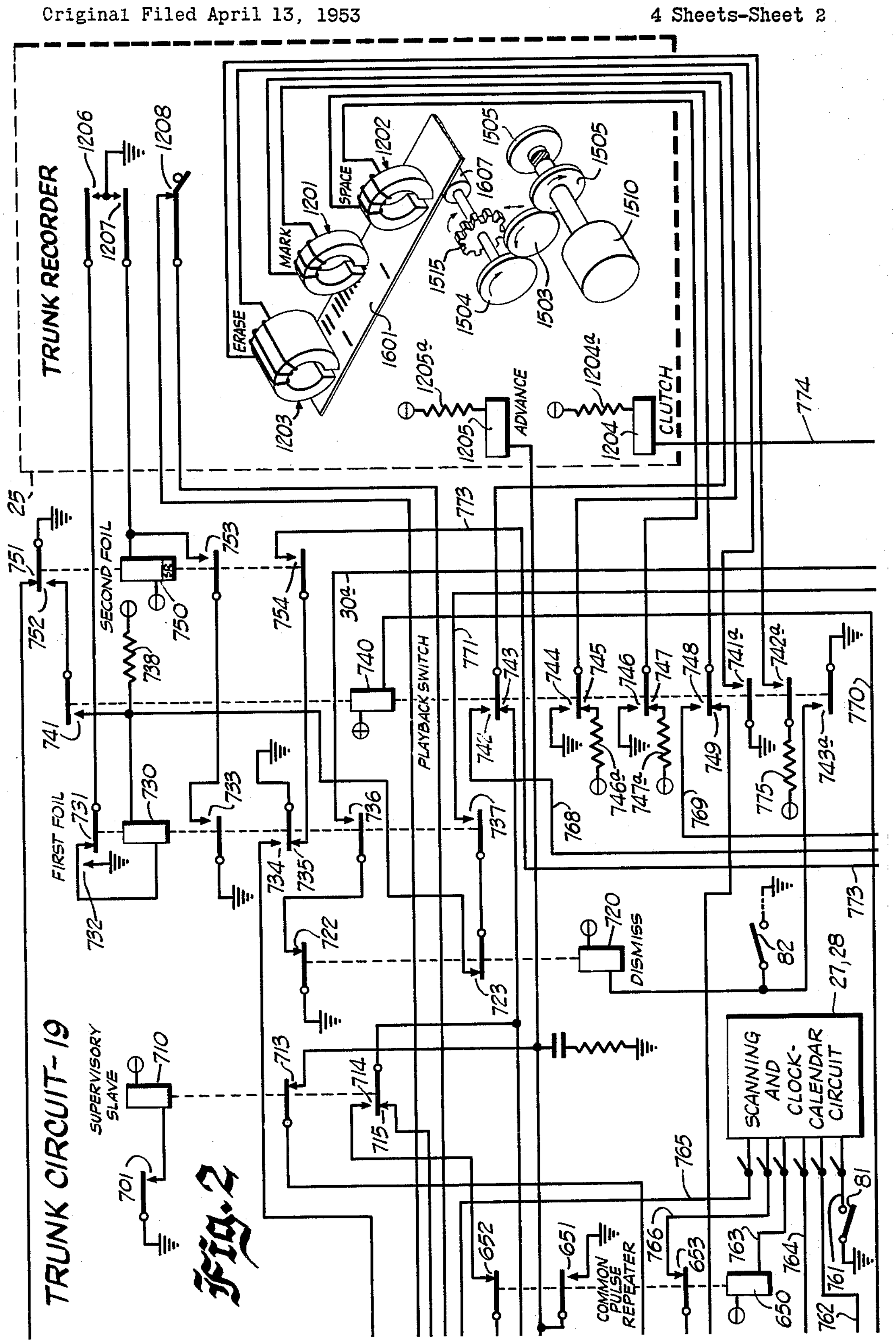
Figure 3:
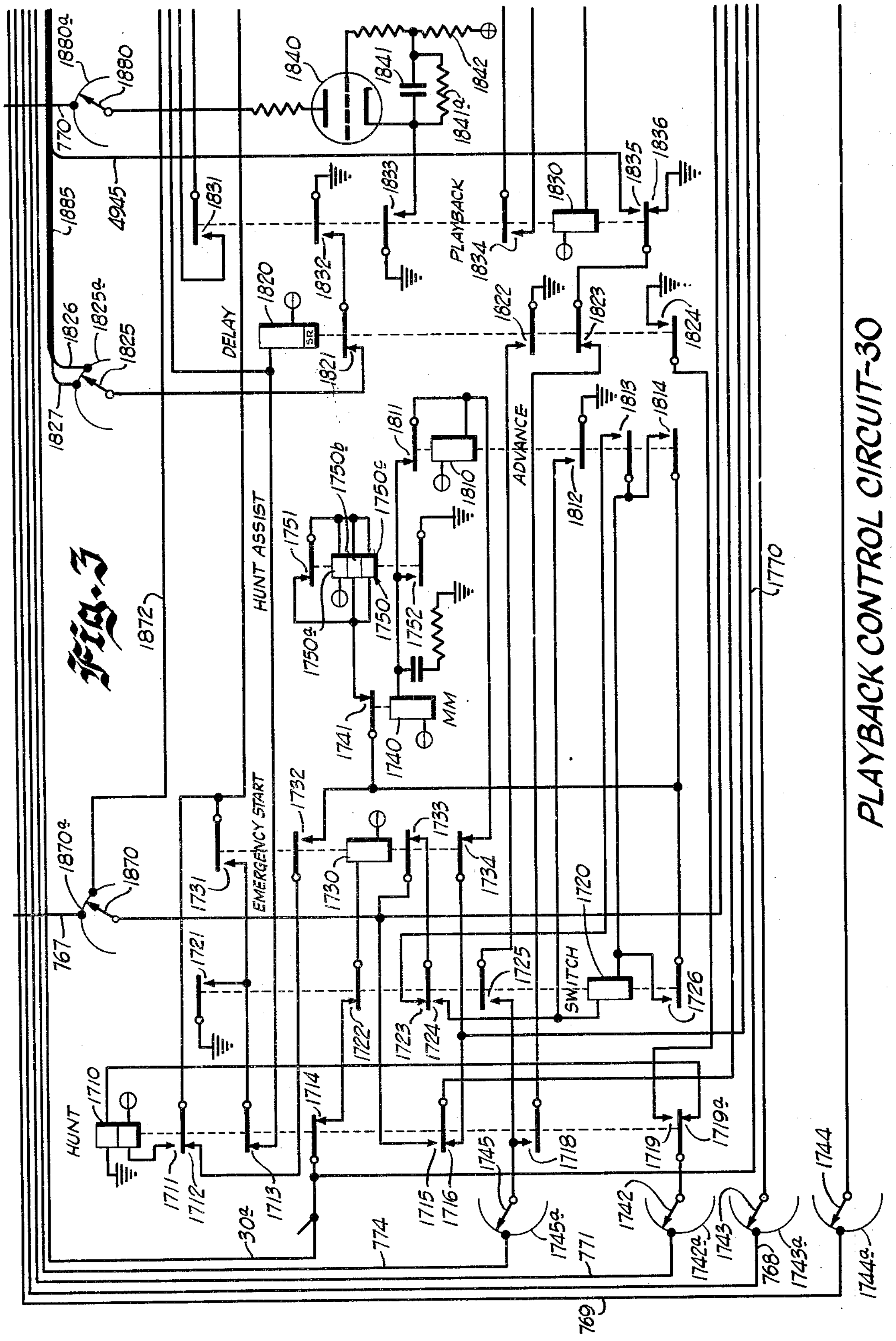

As indicated above, this application is a division of the above identified patent to Frank A. Morris et al. which discloses a complete automatic toll ticketing system. Since the present application is directed to the magnetic storage units provided therein and means for recording information in and reproducing information from these units, only that portion of the telephone system disclosed in the copending application which pertains to the present invention is described herein. As an example, the trunk circuit 19, which provides means for entering digits into the trunk recorder 25, also performs a number of additional functions relating to the extension of the telephone connection and the identification of the calling substation. However, only those portions of the trunk circuit 19 that pertaining to the storage of digital information in and the reproduction of the stored digital information from the trunk recorder 25 are illustrated in FIGS. 1 and 2 of the drawings. Although the illustrated subject matter has been reduced to that portion which directly relates to the present invention, the reference numbers and designations used throughout the drawings and the specification are identical to those used in the issued patent. In certain instances, new reference numbers have been added to designate functional elements that are shown in the present application in place of circuits and circuit components illustrated in detail in the patent.

TRUNK RECORDERS 25 AND 41

The trunk recorders 25 and 41 (FIG. 2) provide magnetic storage units to which data is supplied by the associated digit entry means or trunk circuits 19 and 40 and from which stored data is derived by the playback control circuit 30. The mechanical construction of the recorders 25 and 41 is disclosed and described in detail in the above identified patent and in the copending application of Howard S. Gleason, Serial No. 378,209, filed September 3, 1953, now Patent No. 2,867,435. In general, each of these recorders or magnetic storage units comprises a base plate on which is detachably mounted a magazine containing an endless loop of magnetic tape 1601. A mark pulse head 1201 and a space pulse head 1202 are disposed adjacent two contiguous portions of the magnetic tape 1601 to define two separate parallel channels or tracks for receiving mark or intelligence signals and space or control signals. An erase head 1203 having a single gap which extends across the entire width or both channels of the magnetic tape 1601 is energized during a playback operation to erase the tape.

During recording operations, the magnetic tape 1601 is stationary and is advanced step-by-step following the recording of each mark or space pulse by a step drive mechanism including a ratchet 1515 driven by an advance magnet 1205. The ratchet 1515 is connected to a capstan 1607 that bears against the tape 1601. The operation of the advance magnet 1205 also opens a pair of interrupter springs 1208. During playback operation, the tape 1601 is advanced at high speed by a continuous drive mechanism including a motor 1510 that is common to the plurality of the trunk recorders 25 and 41. The motor 1510 drives a plurality of wheels 1505, each of which is disposed adjacent and is individual to one of the trunk recorders. When the continuous drive mechanism in one of the trunk recorders is to be rendered effective, a clutch magnet 1204 is energized to move a clutch idler 1503 into concurrent engagement with one of the wheels 1505 and a drivewheel 1504 that is also secured to the drive capstan 1607. In this manner, during playback operation, the magnetic tape 1601 in the trunk recorder is rapidly advanced to produce mark and space impulses which are transmitted to the data utilizing equipment.

In order to provide means for returning the magnetic tape 1601 in the recorder 25 to a fixed point or home position prior to recording and reproducing operations and in order to provide an alarm indication when the magnetic tape in the trunk recorder is filled with items of information, two pairs of tape controlled contacts 1206 and 1207 are provided. These contacts may comprise separate conductive foils carried on the tape 1601 at the effective end or beginning thereof which electrically bridge contact fingers held in engagement with one surface of the magnetic tape.

TRUNK CIRCUITS 19 AND 40

The trunk circuits 19 and 40 provide digit entry means by which groups of intelligence and control signals are stored on the magnetic tapes in the trunk recorders or magnetic storage units 25 and 41, either under the control of manually dialed digits supplied from the calling substation A or under the control of registered digital information provided by the clock-calendar circuit 27 and the scanning circuit 28. Further, the digit entry circuits 19 and 40 selectively characterize the associated magnetic storage units as either busy or idle so that these circuits can be seized to record information or to playback stored information only when the storage unit or trunk recorder is in an idle condition. The trunk circuits 19 and 40 are identical so that a detailed description of the operation of only the trunk circuit 19 is set forth below.

*Operation of the trunk circuit 19 to store data in the recorder 25*

As indicated above, when digital data pertaining to a toll call is to be stored in the magnetic storage unit or recorder 25, one or more digits are dialed at the calling substation so that the switch 14*a* in a seized selector 14 searches for and seizes an idle trunk circuit, such as the trunk circuit or digit entry means 19. In response to seizing the circuit 19, the selector 14 completes the calling loop circuit to the trunk circuit 19. In this condition, a pair of tip and ring conductors 19*t* and 19*r* of a line multiple 19*a* of the trunk circuit 19 are connected together at the calling substation A to complete an operaing circuit for a line relay 530. This circuit extends from ground at a pair of normally closed contacts 751 through the upper winding of the relay 530, a repeater coil 661, the conductor 19*t*, the extended calling loop circuit, the impulsing springs in the dialing device at the station A, the conductor 19*r*, a repeater coil 662 and the lower winding of the relay 530 to grounded battery. The completion of this circuit operates the line relay 530 to open a plurality of contacts 532 and 533 and to close a pair of contacts 531. The closure of the contacts 531 completes an obvious operating circuit for a slow-to-release hold relay 540 so that this relay operates to close a plurality of contacts 541–543. The closure of the contacts 543 grounds a sleeve conductor 19*s* of the trunk circuit 19 to provide a source of ground for both holding the extended switch train and marking the trunk circuit 19 as busy to prevent its seizure by either the playback control circuit 30 or another link circuit, similar to the link circuit 12. Busy ground is maintained on the sleeve conductor 19*s* until the end of the digit recording operations.

Incident to the seizure of the trunk circuit 19 and to the operation of the hold relay 540, a circuit is completed for forwarding ground through a pair of normally closed contacts 611 to operate a second end-of-ticket relay 620. In operating, the relay 620 closes a plurality of contacts 621 and 623 and opens a pair of contacts 622. These contact operations merely prepare circuits for subsequent use during the recording of information in the data storage unit or recorder 25.

When the fist digit of manually recorded information is to be stored in the trunk recorder 25, such as the first digit of the designation of the calling substation A, the operation of the dialing device at this station produces a series of interruptions in the completed circuit including the conductors 19*t* and 19*r* equal to the value of the digit to be recorded. Accordingly, when the first line break or opening of the path including the conductors 19*t* and 19*r* occurs, the above described operating circuit for the line relay 530 is opened so that this relay releases to open the contacts 531 and to close the contacts 532 and 533. The opening of the contacts 531 interrupts the operating circuit for the hold relay 540, but this relay remains operated due to the slow-to-release characteristic thereof. The closure of the contacts 533 completes a circuit for energizing the mark pulse head 1201 so that a first mark pulse is recorded on the magnetic tape 1601. The ground provided at the closed contacts 533 extends through the closed contacts 542 and a plurality of pairs of normally closed contacts 715 and 743 to be applied to one side of the operating winding of the mark pulse head 1201. The other side of this winding is connected to negative battery through a pair of normally closed contacts 745 and a series resistor 746*a*. Thus, the closure of the contacts 533 completes a circuit for energizing the mark pulse head 1201 to record a first mark pulse on the magnetic tape 1601 in the group of pulses representing the value of the first dialed digit.

Referring back to the above described first release of the line relay 530, the closure of the contacts 532 completes an operating circuit for a digit relay 550 extending through the closed contacts 541. In operating, the digit relay 550 closes a plurality of contacts 552 and 555 and opens a plurality of contacts 553 and 554. The closure of the contacts 552 completes an obvious operating circuit for a first pulse forming relay 560 so that this relay operates to close a plurality of contacts 561 and 563 and to open a pair of contacts 562. The closure of the contacts 561 completes an obvious operating circuit for a second pulse forming relay 600 so that this relay operates to open a pair of contacts 601 and to close a plurality of contacts 602 and 603. The operation of the relays 550, 560 and 600 conditions the trunk circuit 19 for supplying information to the trunk recorder 25.

When the line relay 530 operates at the end of the first line break due to the dialing of the first digit at the substation A, the contacts 532 and 533 are opened and the contacts 531 are closed. The opening of the contacts 533 interrupts the above described circuit for energizing the winding of the mark pulse head 1201. Thus, the recording of the first mark pulse on the tape 1601 is terminated. The closure of the contacts 531 again completes the operating circuit for the relay 540 and also forwards ground through the closed contacts 555 and a pair of normally closed contacts 713 to operate the advance magnet 1205, one terminal of the winding of the magnet 1205 being connected to grounded battery through a resistor 1205*a*. The operation of the advance magnet 1205 actuates the step drive mechanism including the ratchet 1515 so that the magnetic tape 1601 is advanced a single step following the recording of the first mark pulse. The opening of the contacts 532 interrupts the above described operating circuit for the digit relay 550, but this relay is slow-to-release and does not release at this time. Similarly, the first and second pulse forming relays 560 and 600, which are operated under the control of the digit relay 550, remain operated because of the slow-to-release characteristic of the digit relay 550.

In a similar manner, each line break produced by the dialing device at the calling substation A causes the release and reoperation of the line relay 530 so that an additional mark pulse is recorded on the tape 1601 by the momentary energization of the head 1201. The tape 1601 is advanced step-by-step following the recording of each of the mark pulses by the momentary operation of the advance magnet 1205.

In the interdigit interval following the dialing of the first digit at the station A, the relay 530 remains operated over the above described circuit so that the contacts 531 are closed and the contacts 532 and 533 are opened. The opening of the contacts 532 interrupts the operating circuit for the digit relay 550. After its slow-to-release interval, which is less than the interdigit interval separating successive dialed digits, this relay releases to open the contacts 552 and 555 and to close the contacts 553 and 554. The closure of the contacts 553 forwards ground over a circuit including the closed contacts 563 and 623 and a pair of normally closed contacts 749 to one terminal of the winding of the space head 1202. The other terminal of this winding is connected to grounded battery through a pair of normally closed contacts 747 and a series resistor 747*a*. Thus, the release of the digit relay 550 records a space pulse on the space pulse channel of tape 1601 immediately following the group of mark pulses representing the value of the first stored digit.

The opening of the contacts 552 interrupts the above described operating circuit for the first pulse forming relay 560 so that, after its slow-to-release interval, this relay releases to open the contacts 561 and 563 and to close the contacts 562. The opening of the contacts 563 interrupts the above described energizing circuit for the winding of the space head 1202. The closure of the contacts 562 forwards ground through the closed contacts 603 to the winding of the advance magnet 1205 so that the magnetic tape 1601 is advanced a single step following the recording of the single space pulse. The opening of the contacts 561 interrupts the operating circuit for the second pulse relay 600 so that, after its slow-to-release interval, this relay releases to open the contacts 603, among others. The opening of the contacts 603 releases the advance magnet 1205.

Accordingly, as each digit is dialed at the station A, a series of pulses equal in number to the value of the digit to be stored is applied to the mark pulse head 1201 and recorded as mark pulses on the intelligence channel of the tape 1601. In response to the termination of the series of line breaks representing the digit to be stored, the relays 550, 560 and 600 restore to their normal positions in sequence to record a space pulse on the magnetic tape 1601 in the space channel thereof immediately following the group of mark pulses representing the value of the stored digit. After the space pulse has been recorded, the magnetic tape 1601 is advanced a single step to condition it for receiving a subsequent series of mark pulses representing the value of the next digit to be stored. The trunk circuit 19 operates as described above to record any number of digits in the magnetic storage unit or recorder 25 under the control of the dialing device at the calling substation A.

As described in the above identified Morris et al. patent, the series of manually dialed digits preferably comprises the designation of the calling substation A and the designation of the called station C. In the event that the call is completed to the station C, answering supervisory signals are received by the trunk circuit 19 and are utilized by circuits therein (not shown) to close a pair of contacts 701. The closure of the contacts 701 completes an operating circuit for supervisory slave relay 710 so that this relay operates to open the contacts 713 and 715 and to close a pair of contacts 714. The opening of the contacts 713 interrupts one circuit for applying operating signals to the advance magnet 1205, and the opening of the contacts 715 interrupts one circuit for applying ground pulses to the mark pulse head 1201. However, the closure of the contacts 714 prepares an additional circuit for energizing the mark pulse head 1201. As described in detail in the Morris et al. application, the trunk circuit 19 now operates to record a series of mark pulses on the magnetic tape 1601 representing the duration of the toll call.

When the toll call is completed and the subscriber at the substation A goes "on-hook," the operating circuit for the line relay 530 including the conductors **19*t* and 19*r* is opened so that the relay 530 releases to close the contacts 532 and 533 and to open the contacts 531. The closure of the contacts 532 causes the sequential operation of the digit relay 550, the first pulse forming relay 560, and the second pulse forming relay 600. The opening of the contacts 531 interrupts the operating circuit for the hold relay 540 so that, after its slow-to-release interval, this relay releases to release the relays 550, 560 and 600 in that sequence. The sequential operation and release of the relays 550, 560 and 600 records a space pulse on the tape 1601 following the group of mark pulses representing the duration of the call and operates the advance magnet 1205 to step the tape 1601 following the recording of the space pulse. Further, when the relay 540 releases to open the contacts 543, ground is momentarily removed from the sleeve lead 19*s* so that the switch train from the line circuit 11 to the trunk circuit 19 is released. However, since additional information is to be stored in the recorder 25 pertaining the previous toll call, it is necessary to prevent the trunk circuit 19 from being seized until this additional information has been stored. Accordingly, the circuit 19 includes additional circuits (not shown) for grounding the conductor 19*s* so that the circuit 19 can not be seized either by link circuits, such as the link circuit 12, or by the playback control circuit 30. These additional circuits are indicated schematically in FIG. 1 of the drawings by a switch 80 that is closed to ground the conductor 19*s***.

As described in detail in the above identified Morris et al. patent, the next items of information to be stored in the magnetic storage unit or recorder 25 are seven groups of mark pulses representing the month, day, hour and minute that the call was terminated. This information is provided by the clock-calendar circuit 27 and the scanning circuit 28 (FIG. 2) which are identical to the like designated components disclosed in the above identified Morris et al. patent. The trunk circuit 19 includes suitable circuits (not shown) which place the scanning circuit 28 in operation so that groups of mark pulses representing the date and time values stored in the clock-calendar circuit 27 are transmitted to and stored in the recorder 25 under the control of the circuit 19. These circuits are schematically represented in FIG. 2 of the drawings by a switch 81 that is operated to apply ground to a start conductor 761 which extends to the clock-calendar circuit 27 and the scanning circuit 28. The application of ground to the start conductor 761 initiates the seizure of the circuits 27 and 28. If these circuits are in an idle condition, ground is returned over a pickup lead 762 and is forwarded through a pair of normally closed contacts 649 to complete an obvious operating circuit for a clock relay

640. The start ground provided by the switch 81 is removed following the operation of the relay 640.

The operation of the relay 640 opens a pair of contacts 641 and the contacts 649 and closes a plurality of contacts 642, 645, 646 and **649*a*. The contacts 649 and 649*a* form a make-before-break contact arrangement in which the closure of the contacts 649*a* completes a holding circuit for the relay 640 extending to ground in the scanning circuit 28 over a holding conductor 764 prior to the opening of the contacts 649 to interrupt the above described operating circuit. The closure of the contacts 645 prepares a circuit for extending mark pulses applied to a conductor 765 by the circuit 28 to the mark pulse head 1201. The closure of the contacts 646 prepares a circuit for extending space pulses supplied to a conductor 766 by the scanning circuit 28 to the space pulse head 1202. The closure of the contacts 642 completes an obvious operating circuit for an end-of-call relay 630 so that this relay operates to close a plurality of contacts 631 and 632. The closure of the contacts 632 provides an additional source of holding ground that is extended through the closed contacts 554 to the sleeve conductor 19*s***.

The scanning circuit 28 now initiates the transmission of seven groups of mark pulses separated by space pulses under the control of the clock-calendar circuit 27 representing the date on which and time at which the call was completed. When the first mark pulse or ground signal is applied to the conductor 765, this ground is forwarded through the closed contacts 645, a pair of normally closed contacts 652, and the closed contacts 714 and 743 to again energize the mark head 1201. Ground is then removed from the conductor 765 and is applied to an advance pulse conductor 763 to operate a common pulse repeater relay 650. The relay 650 opens the contacts 652 and 653 and closes a pair of contacts 651. The closure of the contacts 651 forwards ground to the operating winding of the advance magnet 1205 so that the magnetic tape 1601 is advanced a single step following the recording of the first mark pulse in the date and time information. The opening of the contacts 652 and 653 interrupts the above described paths for applying signals to the mark and space pulse heads 1201 and 1202. When the ground pulse is removed from the advance conductor 763 by the scanning circuit 28, the relay 650 is released to restore the contacts controlled thereby to their normal positions. In opening the contacts 651, the advance magnet 1205 is released and, in closing the contacts 652 and 653, the circuits for energizing the mark and space heads 1201 and 1202 are again prepared.

In a similar manner, the scanning circuit 28 continues the transmission of alternate pulses to the mark pulse conductor 765 and the advance pulse conductor 763 so that the mark pulses in the first group representing the value of the first digit of the date and time information are stored on the magnetic tape 1601 in the magnetic storage unit 25. At the completion of the transmission of the first group of mark pulses, the scanning circuit 28 applies a ground pulse to the space pulse conductor 766 which is forwarded through the closed contacts 653, 646, and 749 to energize the winding of the space pulse head 1202. This records a space pulse on the space pulse channel of the tape 1601 to signify the completion of the recording of the first group of mark pulses representing the first digit of date and time information. Thereafter, the scanning circuit 28 applies ground to the advance pulse conductor 763 so that the common pulse repeater relay 650 is again operated to actuate the advance 1205 and to advance the magnetic tape 1601 a single step following the recording of this space pulse.

In a similar manner, the scanning circuit 28 transmits six additional groups of mark pulses followed by space pulses representing the values of the remaining six digits of date and time information. These digits are stored on the magnetic tape 1601 of the trunk recorder 25 in the manner described in detail above. When all of the date and time information pertaining to the toll call has been transmitted to and stored in the trunk recorder 25, the trunk circuit 19 and the connected recorder 25 can be restored to a normal condition. However, incident to being restored to a normal condition in which they are capable of being seized to record items of information pertaining to another call, the digit entry circuit or trunk circuit 19 records an end-of-call signal on the magnetic tape 1601 to signify the completion of the recording of all of the pertinent items of information. The circuit 19 also spaces out the magnetic tape 1601 to physically separate the information pertaining to one call from the digital data pertaining to the next call.

More specifically, at the completion of the sending operation, the scanner 28 removes ground from the holding conductor 764 so that the clock relay 640 is released after its slow-to-release interval to close the contacts 641 and 649 and to open the contacts 642, 645, 646 and 649*a*. The release of the relay 640 also causes the release of the relay 710. The opening of the contacts 645 and 646 interrupts the above described circuits for applying ground to the mark and space heads 1201 and 1202. The opening of the contacts 642 interrupts the above described operating circuit for the end-of-call relay 630. However, a capacitor 638 connected to the winding of the relay 630 has been charged over a circuit extending through a series resistor 637. Accordingly, when the contacts 642 are opened, the capacitor 638 discharges through the resistor 637 and the winding of the relay 630 to maintain this relay operated for a predetermined period of time.

The closure of the contacts 641 completes an operating circuit for a first end-of-ticket relay 610 which extends from ground through the closed contacts 641 and 631. In operating, the relay 610 opens the contacts 611 and closes a plurality of contacts 612 and 613. The opening of the contacts 611 interrupts the above described operating circuit for the second end-of-ticket relay 620. However, this relay is slow-to-release and does not release at this time. The closure of the contacts 612 and 613 simultaneously energizes the mark and space heads 1201 and 1202 to record an end-of-call signal on the tape 1601 comprising concurrent pulses in both of the mark and space channels. More specifically, the closure of the contacts 612 extends ground through the closed contacts 641, 631, 612, 621 and 743 to energize the winding of the mark head 1201. The closure of the contacts 613 extends ground through the closed contacts 641, 631, 613, 623 and 749 to energize the space head 1202. Thus, an end-of-call signal or code comprising concurrent and transversely aligned mark and space pulses is recorded on the tape 1601 at the conclusion of the entry of all of the digits pertaining to the toll call.

After the slow-to-release interval of the second end-of-ticket relay 620, this relay releases to open the contacts 621 and 623 and to close the contacts 622. The opening of the contacts 621 and 623 interrupts the above described circuits for concurrently energizing the mark and space heads 1201 and 1202. The closure of the contacts 622 forwards the ground provided at the closed contacts 612 through the closed contacts 601 to complete an alternate operating circuit for the pulse forming relay 560 so that this relay operates to close the contacts 561 and 563 and to open the contacts 562. The closure of the contacts 563 completes a holding circuit for the first end-of-ticket relay 610 extending through the closed contacts 553, 563 and 613. The closure of the contacts 561 again completes an obvious operating circuit for the second pulse forming relay 600 so that this relay operates to close the contacts 602 and 603 and to open the contacts 601. The closure of the contacts 602 completes a holding circuit for the relay 600 which extends from ground at the closed contacts 641 through the closed contacts 631, 612 and 602, and the closed interrupter contacts 1208 controlled by the advance magnet 1205. The closure of the contacts 603 prepares a circuit for forwarding ground to the advance magnet 1205.

The opening of the contacts 601 interrupts the above described operating circuit for the first pulse forming relay 560 so that this relay releases after its slow-to-release interval. In releasing, the relay 560 opens the contacts 561 and closes the contacts 562, among others. The closure of the contacts 562 forwards ground through the closed contacts 603 to operate the advance magnet 1205 so that the magnetic tape 1601 is advanced a first step following the recorded end-of-call signal. The opening of the contacts 561 interrupts the above described operating circuit for the second pulse forming relay 600. However, this relay remains operated over the above described holding circuit. However, when the advance magnet 1205 operates to open the interrupter contacts 1208, the holding circuit for the second pulse forming relay 600 is interrupted, and this relay releases after its slow-to-release interval to open the contacts 602 and 603 and to close the contacts 601. The opening of the contacts 601 removes ground from the conductor extending to the advance magnet 1205 so that this magnet releases. The opening of the contacts 602 interrupts an additional point in the holding circuit for the relay 600, and the closure of the contacts 601 again completes the operating circuit for the relay 560.

Thus, the first pulse forming relay 560 and the second pulse forming relay 600 are intermittently operated and released under the control of the interrupter springs 1208 to intermittently operate the advance magnet 1205 so that the magnetic tape 1601 is advanced step-by-step. At the end of the slow-to-release interval of the end-of-call relay 630, this relay releases to open the contacts 631 and 632. The opening of the contacts 631 removes the source of operating ground from the circuit for the first end-of-ticket relay 610, the first pulse forming relay 560, and the second pulse forming relay 600 so that cyclic operation of the latter two relays is terminated. The opening of the contacts 632 removes holding ground from the sleeve conductor 19*s* to permit the trunk circuit or digit entry circuit 19 and its associated recorder or magnetic storage unit 25 to be seized by either the playback control circuit 30 or one of the link circuits. Incident to restoring the trunk circuit 19 to its normal condition, the operating circuit extending through the now closed contacts 611 for the second end-of-ticket relay 620 is interrupted until such time as the circuit 19 is next seized. Similarly, the circuits in the trunk circuit 19 represented by the switches 80 and 81 are restored to normal so that ground is not applied to the start conductor 761 or to the sleeve conductor 19*s*.

As indicated above, the trunk recorder 25 includes an endless or closed loop of magnetic tape 1601 that has a predetermined data storage capacity. Accordingly, in the event that the information stored on the tape 1601 is not removed at frequent enough intervals, the magnetic member 1601 may become filled with items of information. If additional information is stored on the tape 1601 following the time at which its storage capacity is exhausted, the information previously stored as well as the information being stored is rendered unintelligible. Accordingly, the trunk circuit 19 and the trunk recorder 25 include means for marking the magnetic storage unit 25 as busy when its storage capacity is exceeded so as to prevent its seizure and means for placing the playback control circuit 30 in operation to immediately seize the recorder 25 and remove the stored information. If the storage capacity of the unit 25 is exceeded during the extension of a toll call, the digit entry means or trunk circuit 19 include means for automatically releasing the connection.

More specifically, the tape 1601 is advanced step-by-step during the data collecting and storing operations. When the effective end of the loop of tape 1601 reaches the heads 1201–1203, the first set of foil contacts 1206 is momentarily closed to complete an operating circuit for a first foil relay 730. This circuit extends from ground through the closed contacts 1206, a pair of normally closed contacts 731, the winding of the relay 730 and to grounded battery through a series resistor 738. The operation of the relay 730 opens a plurality of contacts 731 and 735 and closes a plurality of contacts 732, 733, 734, 736 and 737. The contacts 731 and 732 form a make-before-break contact arrangement so that the closure of the contacts 632 completes an obvious holding circuit for the relay 730 prior to the opening of the contacts 731 to interrupt the above described operating circuit. The closure of the contacts 734 forwards ground to the contacts 554 which are opened or closed in accordance with the progress of the call. The ground supplied to the contacts 554 is to be forwarded to the sleeve conductor 19_s_ to mark the trunk circuit 19 as being busy, thereby to prevent its seizure following the completion of the storing of the information pertaining to the call in progress. The closure of the contacts 736 and 737 prepares circuits for placing the playback control circuit 30 in operation to seize the filled trunk recorder 25. A dismiss relay 720 is normally held in an operated condition by circuits (not shown) represented by a switch 82 that is closed during the call. Thus, the circuits prepared by the closed contacts 736 and 737 can not be completed. The closure of the contacts 733 prepares a holding circuit for a second foil relay 750.

If the toll call in progress is released at this time or at any time prior to the closure of the second foil contacts 1207, the trunk circuit 19 controls the circuits (not shown) represented by the switch 82 so that the operating circuit for the dismiss relay 720 is interrupted. In releasing, this relay closes a plurality of contacts 722 and 723, among others. The closure of the contacts 722 forwards ground through the closed contacts 736 to a conductor 30_a_. The application of ground to the conductor 30_a_ places the playback control circuit 30 in operation so that the filled trunk recorder 25 is immediately seized. The closure of the contacts 723 forwards negative battery through the series resistor 738 and the closed contacts 723 and 737 to a conductor 771. The application of negative battery to the conductor 771 marks the digit entry control means or trunk circuit 19 as being connected to a filled magnetic storage unit or recorder 25 so that the playback circuit 30 seizes the recorder 25 to remove the information stored on the tape 1601.

Assuming that the call is not released subsequent to the closure of the contacts 1206, the dismiss relay 720 remains operated and the magnet tape 1601 is advanced under the control of the magnet 1205 during the recording of additional information pertaining to the call in progress. Thus, when the tape 1601 has advanced a predetermined distance beyond the point at which the contacts 1206 are closed, the contacts 1207 are momentarily closed to apply ground to the operating winding of the second foil relay 750 so that this relay operates to close a plurality of contacts 752, 753 and 754 and to open the contacts 751. The closure of the contacts 753 completes a holding circuit for the relay 750 extending to ground through the closed contacts 733. The opening of the contacts 751 removes ground from the operating circuit for the line relay 530 so that this relay releases.

In releasing, the line relay 530 causes the recording of the date and time information, the recording of the end-of-call signal, and the spacing of the magnetic tape 1601, as described above and in the above identified copending Morris et al. patent. Incident to these operations, the trunk circuit 19 is restored to a released condition. However, because of the prior closure of the contacts 734, the sleeve conductor 19_s_ is now marked as busy to prevent seizure of this circuit. Incident to this restoration of the trunk circuit 19, the dismiss relay 720 is released, as described above, to again close the contacts 722 and 723. The closure of these contacts places the playback control circuit 30 in operation and marks the trunk circuit 19 and the trunk recorder 25 as requiring a playback operation.

*Operation of the trunk circuit 19 during a playback operation*

As indicated above, during a normal playback of the information from the plurality of trunk recorders 25 and 41, the recorders 25 and 41 are sequentially rendered effective to transmit information to the printer 36 through the intermediate electronic storage means provided by the registers 38 and the computer 39. The trunk recorders are seized in sequence under the control of switching means in the playback control circuit 30 which sequentially test the associated trunk circuits or digit entry control means for the presence of a busy or an idle condition. If the digit entry control circuit is busy, ground is detected on a test lead 767 with the result that the switching means and the playback control circuit are automatically advanced to the next succeeding register or trunk circuit.

Assuming that the trunk circuit 19 is idle when this circuit is selected by the circuit 30, the absence of ground on the test lead 767 advises the playback control circuit 30 that the trunk circuit 19 can be seized and connected to the playback equipment. In responding to this information, the playback control circuit 30 connects a clutch lead 774 to ground to complete a circuit through a resistor 1204_a_ for energizing the clutch magnet 1204. The playback control circuit 30 also connects the test lead 767 to ground to mark the sleeve lead 19_s_ as busy in the contact banks of the selectors having access thereto.

When the magnet 1204 is energized, it shifts the idler 1503 into concurrent engagement with the wheels 1504 and 1505, the motor 1510 previously having been placed in operation by the playback control circuit 30. This drives the tape 1601 at a rapid speed to its effective beginning so that the first foil contacts 1206 are momentarily closed to complete the above described operating circuit for the first foil relay 730. The operation of the relay 730 performs the same functions described above except that the application of ground to the conductor 30_a_ performs no useful function inasmuch as the operation of the playback control circuit 30 has previously been initiated. The closure of the contacts 737 forwards negative battery over the conductor 771 to cause the playback control circuit 30 to apply ground to this conductor. This ground shunts the right hand terminal of the winding of the relay 730 to ground so that this relay releases to restore its contacts to their normal conditions.

The continuing movement of the magnetic tape 1601 then causes the momentary closure of the contacts 1207 so that the relay 750 is operated. The closure of the contacts 754, when the relay 750 operates, forwards ground from the closed contacts 735 to a conductor 773. Since the contacts 1207 are only momentarily closed during the movement of the tape 1601, ground is removed from the conductor 773 by the release of the relay 750 after its slow-to-release interval. In the event that both of the relays 730 and 750 are operated by the contacts 1206 and 1207 prior to the release of the relay 730 by the playback control circuit 30, the holding circuit for the relay 750 including the contacts 733 and 753 and the slow-to-release characteristic of this relay insure that a ground pulse is supplied to the conductor 773.

The application of ground to the conductor 773 renders a tube in the playback control circuit 30 conductive, the anode of which is connected over a conductor 770 to the operating winding of a playback switch relay 740. Accordingly, firing this tube in the playback control circuit 30 operates the relay 740 to close a plurality of contacts 741, 742, 744, 746, 748, 741_a_, 742_a_ and 743_a_ and to open the contacts 743, 745, 747 and 749. The closure of the contacts 742 connects one side of the mark head 1201 to the conductor 768 that extends to the playback control circuit 30, and the opening of the contacts 743 disconnects this head from local pulsing circuits in the trunk circuit 19. The closure of the contacts 744 connects the other terminal of the winding of the mark head 1201 to ground, and the opening of the contacts 745 disconnects this terminal of the winding from negative battery. Similarly, the closure of the contacts 748 connects the one terminal of the winding of the space head 1202 to a conductor 769 that extends to the playback control circuit 30, and the opening of the contacts 749 disconnects the space head 1202 from local pulsing circuits in the trunk circuit 19. The opening of the contacts 747 disconnects the other terminal of the winding of the space head 1202 from negative battery, and the closure of the contacts 746 connects this terminal to ground.

The closure of the contacts 741*a* and 742*a* completes an obvious energizing circuit for the erase head 1203 so that this head is now effective to erase both of the channels of the tape 1601 as this tape is moved relative to the transducing heads 1201–1203. However, the erase head 1203 is located behind the heads 1201 and 1202 considered relative to the direction of movement of the tape 1601 so that mark and space pulse information is erased only following its transmission to the playback control circuit 30. The closure of the contacts 743*a* completes an obvious operating circuit for the dismiss relay 720 so that this relay operates to open the contacts 722 and 723, among others. The opening of these contacts prevents the application of marking and start potentials to the conductors 771 and 30*a* when the first foil relay 730 is again operated at the end of the playback of the information from the trunk recorder 25. Thus, the operation of the playback switch relay 740 disconnects the trunk recorder 25 from an operative association with the digit entry means provided by the trunk circuit 19 and renders the trunk recorder 25 effective to supply information under the control of the playback control circuit 30 and the printing control circuit 35 to the electronic registers 38 and the computer 39. The trunk circuit 19 remains in this condition in which the relays 720 and 740 are operated and the relays 730 and 750 are released until such time as the data transmitting operations have been completed.

To signify the completion of the data recording operation when the effective end of the tape 1601 is reached, the foil contacts 1206 are again momentarily closed to operate the first foil relay 730. The continuing movement of the magnetic tape 1601 next closes the contacts 1207 so that the second foil relay 750 is again operated. When this relay operates to close the contacts 752, ground is forwarded through the closed contacts 741 on the playback switch relay 740 to provide a ground shunt around the winding of the first foil relay 730. Thus, this relay releases to close the contacts 735. The closure of these contacts and the prior closure of the contacts 754 again supply a ground pulse to the conductor 773. The application of a ground pulse to the conductor 773 at this time advises the playback control 30 that the data playback operation has been completed. In response to the receipt of this information, the playback control circuit 30 removes ground from the conductor 774 so that the clutch magnet 1204 is released and also interrupts the operating circuit for the playback switch relay 740 so that this relay releases. The release of the relay 740 together with the release of the relays 730 and 750 and the release of the dismiss relay 720 in response to the release of the relay 740 aids in restoring the trunk circuit 19 to a normal condition. In this normal condition, the interconnection between the trunk recorder 25 and the playback equipment is opened and the trunk circuit is again effective to record data in the recorder 25. As described in detail in the above identified Morris et al. patent, the release of the trunk circuit 19 and the recorder 25 by the playback control circuit 30 causes the recording of a preliminary end-of-call signal on the magnetic tape 1601 and the step-by-step advance of this tape so that the point on this tape at which the first items of information are stored is spaced from the foil contacts 1206 and 1207.

As indicated above, if the tape 1601 of the recorder 25 becomes nearly or completely filled with items of information while a call is in progress, one or both of the foil relays 730 and 750 are operated. In either event, a path is completed through the contacts 722 and 736 for grounding the emergency start lead 30*a* extending to the playback control circuit 30. If the playback facilities are not in use at the time that the emergency start lead 30*a* is connected to ground, the operation of the sequence switch in the playback control 30 is initiated to search for and seize the trunk circuit 19. When the lead 30*a* is grounded, the selecting switch in the playback control circuit 30 tests for the presence of battery potential on the lead 771 rather than the absence of ground potential on the lead 767. When the trunk circuit 19 is seized, the playback control circuit 30 grounds the conductor 774 to energize the clutch magnet 1204 and thus initiates continuous movement of the tape 1601. Further, the playback control circuit grounds the lead 771 to shunt the winding of the first foil relay 730 so that this relay releases together with the second foil relay 750. The playback of information from the trunk recorder 25 and the restoration of the trunk circuit 19 and the trunk recorder 25 to a normal condition then takes place in the same manner described above.

PLAYBACK CONTROL CIRCUIT 30

The playback control circuit 30 (FIGS. 3 and 4) provides means for selectively seizing one of the thrunk recorders 25 or 41 in accordance with the idle or busy condition of the entry control means or trunk circuit associated therewith and for initiating the playback of stored data from the magnetic storage units or recorders 25 and 41 to the electronic registers 38 and the cost computer 39. The playback control circuit 30 also includes alarm means to indicate when a trunk recorder or storage unit, such as the units 25 and 40, has been completely played back without supplying sufficient information to provide a complete toll ticket. In the event that this alarm means is operated, the playback control circuit 30 is disabled from searching for and seizing any additional magnetic storage units so as to prevent the loss of information contained in these storage units in the event that either the printing control circuit 35 or he playback control circuit 30 is in an improper operating condition.

The playback control circuit 30 may be initiated to start a searching and seizing operation in any of a plurality of different ways. In the first of these, the playback control circuit 30 is actuated to initiate a cycle of operation in response to the receipt of a pulse from a timing means so that the circuit 30 may be selectively actuated to initiate a cycle of operation at predetermined periods of time. The playback control circuit 30 may be started in response to information received from the one-way trunk circuit 19 and the trunk recorder 25 associated therewith which indicates that this particular trunk recorder 25 is filled with information that must be removed before this trunk recorder can again be utilized to record additional items of information. Manual means are also provided for initiating the operation of the playback control circuit 30.

In its normal condition prior to the initiation of a cycle of operation in any of the above-listed manners, the playback control circuit 30 normally includes a plurality of operated relays. An advance relay 1810 is maintained normally operated by a circuit extending from a normally closed and grounded pair of contacts 1856 through a plurality of normally closed contacts 1716 and 1734 to the operating winding of the relay 1810. Since this relay is normally operated, a plurality of contacts 1812, 1813 and 1814 are normally closed and a pair of contacts 1811 is normally open. A switch relay 1720 is also normally operated by a circuit extending from the grounded battery terminal of a hunt-assist relay 1750 through a plurality of normally closed contacts 1741 and 1814, the operating winding of relay 1720, and the closed contacts 1812 to ground. Since the switch relay 1720 is normally operated, a plurality of contacts 1721, 1724, 1725 and 1726 are closed and a plurality of contacts 1722 and 1723 are open. A slow-to-release delay relay 1820 is normally operated by a circuit extending from grounded battery at one terminal of the winding of the relay 1820 through a normally closed pair of contacts 1713 to ground at the contacts 1721 which are closed by the operation of the relay 1720.

In addition, in the normal condition of the playback control circuit 30, a wiper 1870 is normally in engagement with a contact in the contact bank 1870*a* which is connected to a "dummy" trunk 1872. The remainder of the contacts in the contact bank 1870*a* are connected to the sleeve leads of the plurality of one-way trunk or digit entry control circuits 19 and 40 by conductors similar to the conductor 767.

*Normal operation of the playback control circuit 30*

To provide a means for initiating a cycle of operation of the playback control circuit 30 at timed intervals, the operating winding of a normal start relay 1930 is connected to the clock-calendar circuit 27 by a conductor 1960. The circuit 27 supplied ground to the conductor 1960 at selected times of the day for about a one minute period so as to operate the start relay 1930.

The operation of the normal start relay 1930 closes a plurality of contacts 1931, 1932 and 1933. The closure of the contacts 1933 energizes a motor in the printer 36 so that this printer is conditioned for operation under the control of the information removed from a seized trunk recorder 25. The closure of contacts 1933 also energizes the drive motor 1510 so that the plurality of drive rollers 1505 are placed in continuous rotation. The closure of the contacts 1932 completes a momentary locking circuit for the relay 1930 which extends through a pair of normally closed contacts 1954.

The closure of contacts 1931 operates a home relay 1920. The operating circuit for this relay extends from ground at the closed contacts 1812 through the closed contacts 1724, a normally closed pair of contacts 1733, the wiper 1870, the "dummy" trunk 1872, the closed contacts 1931 and the operating winding of the home relay 1920 to grounded battery. The operation of the home relay 1920 opens the contacts 1922, thereby breaking the locking circuit for the normal start relay 1930, and closes a pair of contacts 1921. The normal start relay 1930 does not release at this time inasmuch as the ground provided by the clock and calendar circuit 27 is still maintained on the conductor 1960. The closure of the contacts 1921 places ground on the operating winding of a dismiss relay 1850 through a pair of normally closed contacts 1891. The dismiss relay 1850 is thus operated to close a plurality of contacts 1851, 1853, 1854 and 1855 and to open a pair of contacts 1852 and 1856. The opening of the contacts 1856 removes ground from the operating winding of the advance relay 1810 so that this relay releases to close a pair of contacts 1811 and to open a plurality of contacts 1812, 1813 and 1814. The opening of the contacts 1812 does not release the switch relay 1720 inasmuch as the closure of the contacts 1854 connects ground to the operating winding of this relay through the normally closed contacts 1733 and the closed contacts 1724. The opening of the contacts 1812 also does not remove ground from the "dummy" trunk 1872 since the closure of the contacts 1854 applies ground thereto through the contacts 1733.

The closure of the contacts 1853 grounds the cathode of a tube 1880 so that, after a predetermined interval of time determined by resistor 1881 and a condenser 1882, the voltage to which the condenser 1882 is charged fires the tube 1880 to operate a second dismiss relay 1890. A large value resistor 1882*a* is shunted across the condenser 1882 to permit the charge thereon to leak off after the contacts 1853 are opened. The operation of the dismiss relay 1890 opens a plurality of contacts 1891 and 1892. The opening of the contacts 1891 interrupts the operating circuit for the first dismiss relay 1850 so that this relay releases. The relay 1850, in releasing, closes the contacts 1852 and 1856 and opens the contacts 1851, 1853, 1854 and 1855. The opening of the contacts 1854 removes ground from the operating winding of the switch relay 1720 so that this relay releases to open the contacts 1721, 1724, 1725 and 1726 and to close the contacts 1722 and 1723. The opening of the contacts 1721 releases the delay relay 1820 so that the contacts 1821 and 1823 are closed and the contacts 1822 and 1824 are opened. The release of this relay produces no useful function at this time. The opening of the contacts 1854 also removes ground from the "dummy" trunk 1872 and from the operating winding of the home relay 1920 so that this relay releases to open the contacts 1921 and to close the contacts 1922. The closure of the contacts 1922 reestablishes the locking circuit for the normal start relay 1930 so that this relay remains operated following the removal of ground from the conductor 1960 by the clock-calendar circuit 27. The closure of the contacts 1922 also lights an electric lamp 1964 to indicate that the start relay 1930 is locked up to initiate a cycle of operation of the circuit 30.

The closure of the contacts 1856, upon the release of the first dismiss relay 1850, operates the advance relay 1810 and also operates a motor magnet 1740 in parallel therewith to open a pair of contacts 1741. The energization of the advance relay 1810 closes the contacts 1812, 1813 and 1814 and opens the contacts 1811. The opening of the contacts 1811 breaks the operating circuit for the motor magnet 1740 so that this magnet releases and advances a plurality of wipers 1742, 1743, 1744, 1745, 1870, 1825, 1880 and 1913 to engage the next contacts in a plurality of contact banks 1742*a*, 1743*a*, 1744*a*, 1745*a*, 1870*a*, 1825*a*, 1880*a* and 1913*a*, respectively. Like positioned contacts in the contact banks 1742*a*, 1743*a*, 1744*a*, 1745*a*, 1870*a*, 1880*a* and 1913*a* are connected with the one-way trunk circuit 19 through the conductors 771, 768, 769, 774, 767, 770 and 773, respectively. The contacts in the contact bank 1825*a* are connected to the printing control circuit 35 through conductors similar to a pair of conductors 1826 and 1827. Although only a single contact in each of these contact banks is shown connected to the trunk circuit 19, it should be understood that the remaining like positioned contacts in the contact banks are connected to other trunk circuits, such as the circuit 40, in accordance with the number of magnetic storage units.

Accordingly, the operation of the dismiss relays 1850 and 1890 under the control of the home relay 1920 operates the motor magnet 1740 to advance the plurality of wipers a single step. As the wiper 1870 moves out of engagement with the contact connected to the "dummy" trunk 1872, the sequential searching operation for an idle trunk recorder 25 and the trunk or digit entry circuit 19 associated therewith is initiated. As explained in detail above, when the circuit 19 is busy, ground is applied to the conductor 767 which is connected to the proper contact in the contact bank 1870*a*. Assuming that the contact now engaged by the wiper 1870 is connected to a busy circuit 19, ground is applied through the wiper 1870 to the operating winding of the hunt-assist relay 1750. This circuit extends from the grounded contact in the contact bank 1870*a* through the wiper 1870, the closed contacts 1733, 1723, 1813, 1814 and 1741 and an operating winding 1750*a* of the relay 1750 to grounded battery.

The operation of the relay 1750 opens a pair of contacts 1751 and closes a pair of contacts 1752. The opening of the contacts 1751 removes the direct shunt around a pair of non-inductive resistance windings 1750*b* and 1750*c* so that the parallel resistance provided by these two windings is inserted in series with the inductive operating winding 1750*a*. The insertion of resistance in series with the inductive winding 1750*a* limits the current flowing therethrough and thereby limits the arcing present at the contacts 1741 when these contacts are opened. The closure of the contacts 1752 applies ground to the operating winding of the motor magnet 1740 so that this magnet operates to open the contacts 1741.

The opening of the contacts 1741 breaks the operating circuit for the hunt-assist relay 1750 so that this relay releases to reclose the contacts 1751 and to open the contact 1752, thereby breaking the operating circuit for the motor magnet 1740. This sequential operation and release of the motor magnet 1740 steps the plurality of wipers 1742, 1743, 1744, 1745, 1825, 1870, 1880 and 1913 to the next adjacent contacts. If the wiper 1870 engages a contact grounded by the trunk circuit connected thereto, thus indicating that this circuit is busy, another cycle of operation of the hunt-assist relay 1750 and motor magnet 1740 is completed. This sequential operation of the magnet 1740 and the relay 1750 continues until such time as the wiper 1870 engages a contact connected to an idle trunk. At this time, no ground is applied to the operating winding of the hunt-assist relay 1750 so that this relay does not operate to advance the stepping switch controlled by the motor magnet 1740.

The ground supplied to the wiper 1870 by a busy trunk circuit, which produces the sequential operation of the relay 1750 and motor magnet 1740, also maintains the switch relay 1720 released inasmuch as this ground is applied through the contacts 1733, 1723 and 1813 to one side of the operating winding of this relay, thereby providing a ground shunt around the operating winding thereof. When the wiper 1870 is moved into engagement with a contact connected to an idle trunk, the shunting ground is removed from the operating winding of the switch relay 1720, and this relay is operated by a circuit extending from grounded and closed contacts 1812 through the operating winding of the relay 1720, the contacts 1814, 1741 and 1751, and the winding **1750*a* to the battery terminal of the hunt-aassist relay 1750. The operation of the switch relay 1720 closes the contacts 1721, 1724, 1725 and 1726 and opens the contacts 1722 and 1723. The hunt-assist relay 1750 is not operated in series with the switch relay 1720 inasmuch as the resistance in this circuit is too great to permit a sufficient flow of current through the winding 1750*a***.

The closure of the contacts 1726 provides a path for applying battery to the operating winding of the switch relay 1720 from the battery terminal of the hunt-assist relay 1750 and thereby maintains this relay operated in the event that the advance relay 1810 is released.

The closure of the contacts 1724 grounds the sleeve conductor 767 which is connected to the sleeve lead in the trunk circuit 19. The application of ground thereto indicates that this trunk circuit, together with its associated trunk recorder 25, has been seized by the playback control circuit 30. The circuit for applying ground to the conductor 767 extends from the grounded and closed contacts 1812 through the closed contacts 1724 and 1733 to the wiper 1870 which is in engagement with the contact to which are connected the conductors 767 and 19s.

The closure of the contacts 1721 operates the delay relay 1820 through the normally closed contacts 1713. The operation of the delay relay 1820 opens the contacts 1821 and 1823 and closes the contacts 1822 and 1824. The closure of the contacts 1822 applies ground to the wiper 1745 through the closed contacts 1725 so that this ground is applied over the clutch conductor 774 to the operating winding of the clutch magnet 1204 in the seized trunk recorder 25.

The operation of the clutch magnet 1204 in the seized trunk recorder 25 moves the idler wheel 1503 of this trunk recorder into engagement with the drive wheel 1505 and the capstan drive wheel 1504. This drives the magnetic tape 1601 in the seized trunk recorder 25 to sequentially close the foil contacts 1206 and 1207. As explained in detail above, the sequential closure of the foil contacts 1206 and 1207 produces the sequential operation of the first foil relay 730 and the second foil relay 750.

The operation of the first foil relay 730 applies battery over the conductor 771, the wiper 1742, and a pair of closed contacts **1719*a* to the upper operating winding of a hunt relay 1710 to operate this relay. The operation of the relay 1710 closes a plurality of contacts 1711, 1715, 1718, and 1719 and opens a plurality of contacts 1712, 1713, 1714, 1716 and 1719*a*. The closure of the contacts 1711 completes a locking circuit for the lower winding of the relay 1710 which extends to the grounded and normally closed contacts 1852. The opening of the contacts 1713 interrupts the operating circuit for the slow-to-release delay relay 1820. In releasing, the relay 1820 closes the contacts 1821 and 1823 and opens the contacts 1822 and 1824. The opening of the contacts 1822 removes ground from the clutch lead 774, but the clutch magnet 1204 is not released inasmuch as the lead 774 is connected to ground through the contacts 1718 which are closed by the operation of the hunt relay 1710**.

The opening of the contacts 1716 releases the advance relay 1810 so that the contacts 1811 are closed and the contacts 1812, 1813 and 1814 are opened. The opening of the contacts 1812 does not release the switch relay 1720 inasmuch as ground is applied to the operating winding thereof from the grounded and closed contacts 1856 through the contacts 1715, closed by the operation of the hunt relay 1710, and the closed contacts 1733 and 1724.

Since the relay 1820, the operating circuit for which is opened by the operation of the hunt relay 1710, is slow-to-release, the closure of the contacts 1719 in direct response to the operation of the relay 1710 connects ground from the closed contacts 1824 to the conductor 771. The ground applied to this conductor produces the sequential release of the foil relays 730 and 750 in the manner described above in detail. Following the slow-to-release period of the delay relay 1820, the contacts 1824 are opened to remove ground from the conductor 771.

The sequential release of the relays 730 and 750 in the seized trunk circuit 19 applies a momentary ground pulse to the conductor 773 in the manner described above. This ground pulse operates a playback relay 1830 by means of a circuit extending from the grounded battery connected to one terminal of this relay through the operating winding thereof, the normally closed contacts 1892, a pair of normally closed contacts 1911, and the wiper 1913 to the conductor 773. The operation of the playback relay 1830 closes a plurality of contacts 1831, 1832, 1833, 1834 and 1835 and opens a pair of contacts 1836. The closure of the contacts 1834 prepares a circuit for operating a second playback relay 1910. However, the second playback relay 1910 is not operated in response to the closure of the contacts 1834 since, for the duration of the ground pulse existing at the normally closed contacts 1911, the ground at this point shunts the operating winding of the relay 1910 to ground.

The closure of the contacts 1832 connects ground through the closed contacts 1821 to the wiper 1825 associated with the destination contact bank **1825*a* in the stepping switch associated with the playback control circuit 30 so as to ground a conductor similar to the conductors 1826 and 1827 which are connected to the printing control circuit 35 through a cable 1885. The grounding of one of the conductors 1826 or 1827 or conductors similar to these conductors provides the printing control circuit 35 with information identifying the seized magnetic storage unit or recorder 25**.

The closing of the contacts 1835 and the consequent opening of the contacts 1836 transfers the control over the energization of the clutch magnet 1204 in the seized recorder 25 to the printing control circuit 35. Accordingly, the closure of the contacts 1835 signifies that the searching for and seizing of an idle digit entry or trunk circuit 19 and its associated storage unit or trunk recorder 25 is completed. This operation further signifies that the seized recorder 25 is ready to transmit pulses representing the stored items of information to the storage chains 38, the computer 39, and the steering circuit 37. The transfer of the control of the clutch magnet 1204 to the printing control circuit 35 is accomplished by connecting the wiper 1745 to ground at a pair of normally closed contacts 4914 in the printing control circuit 35 over a conductor 4945 and the cable 1885.

The removal of the ground from the wiper 1913 under the control of the foil relays 730 and 750 in the seized trunk circuit 19 removes the ground shunt from the operating winding of the second playback relay 1910 so that this relay is operated in series with the operating winding of the first playback relay 1830 through a circuit extending from battery through the operating winding of the playback relay 1830, the closed contacts 1892 and 1834 and the operating winding of the relay 1910 to ground. The operation of the relay 1910 opens the contacts 1911 and closes a pair of contacts 1912 so that the next ground pulse applied to the wiper 1913 will be conducted to the operating winding of the first dismiss relay 1850.

The closure of the contacts 1833 grounds the cathode of a tube 1840 and also connects one plate of a condenser 1841 to ground. The grounding of the cathode of the tube 1840 conditions this tube for being rendered conductive in response to the application of a sufficiently high voltage to the control electrode thereof. The grounding of one side of the condenser 1841 completes a circuit for charging this condenser which extends from positive battery through a resistance 1842. After a predetermined interval of time, as determined by the values of the resistor 1842 and the condenser 1841, a sufficient charge is placed on the condenser 1841 to render the tube 1840 conductive. When the tube 1840 is fired, a path is completed from ground through the closed contacts 1833, the tube 1840, the wiper 1880, and the conductor 770 to the operating winding of the playback relay 740 in the seized trunk circuit 19 so that this relay operates. The condenser 1841 is shunted by a resistor 1841*a* having a very high resistance to provide a discharge path for the condenser 1841. The time delay provided by the condenser 1841 delays the operation of the playback switch relay 740 for a long enough period to advance the tape 1601 to a point at which any data recorded following the second foil contacts on a filled tape has been moved by the heads 1201–1203.

The operation of the playback relay 740 in the seized trunk circuit 19 closes the plurality of contacts controlled thereby, as explained in detail above, so that the mark pulse head 1201 and the space pulse head 1202 are connected to the conductors 768 and 769, respectively. The conductors 768 and 769 are connected with the inputs of the mark pulse amplifiers 31 and 33 and the space pulse amplifiers 32 and 34 through the wipers 1743 and 1744, respectively. These wipers are positioned on the contacts connected to the conductors 768 and 769 associated with the seized trunk circuit so that the amplifiers 31–34 are selectively connected to only the reproducing heads 1201 and 1202 in the seized trunk recorder 25. This connection of the mark and space heads 1201 and 1202 with the amplifiers 31–34 permits the information stored in the seized trunk recorder 25 to be reproduced and subsequently utilized by the printer 36.

Figure 4:
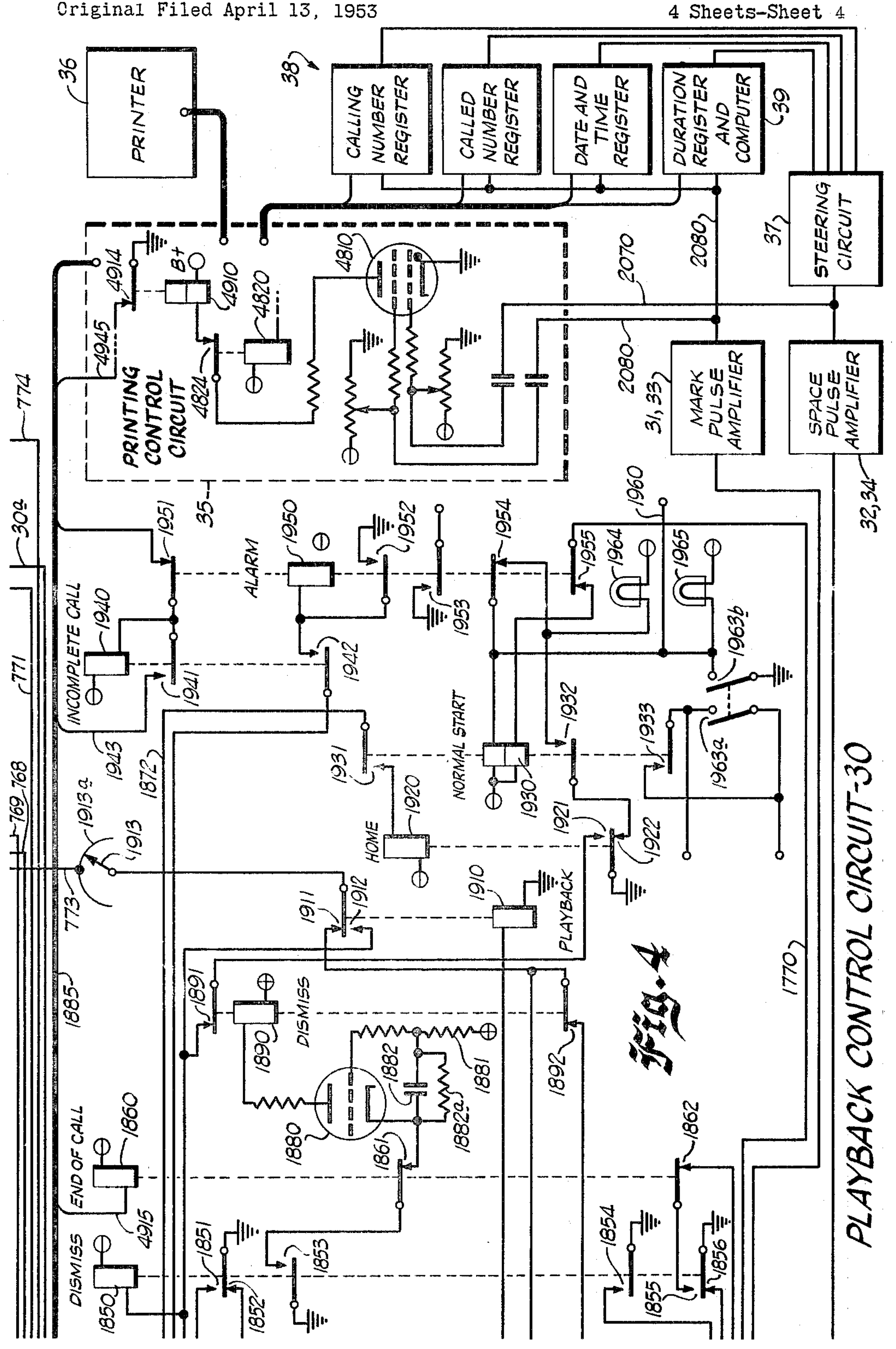

The seized trunk recorder or magnetic storage unit 25 is now conditioned to transmit the stored digital information pertaining to the first toll call to the recording facilities shown in FIG. 4 of the drawings. As indicated above, the first item of information stored on the tape 1601 is an end-of-call signal comprising concurrent mark and space signals. As described above, when the relay 1830 operates to close the contacts 1835, ground is supplied to the clutch magnet 1204 in the seized recorder 25 from the closed contacts 4914 in the printing control circuit 35. As the end-of-call signal is moved past the transducing heads 1201 and 1202, concurrent signals are forwarded over the conductors 768 and 769 and the wipers 1743 and 1744 to the input of the amplifiers 31–34. These two signals are separately shaped and amplified and applied to the space pulse conductor 2070 and the common mark pulse conductor 2080. These two conductors are connected to a pair of control electrodes of an end-of-call tube 4810 in the printing control circuit 35, both of which control electrodes are normally provided with a suitable bias. The application of a mark pulse only to one of these control electrodes or of a space pulse only to the other of these control electrodes is not sufficient to render the tube 4810 conductive. However, the concurrent application of a mark and space pulse to both of the control electrodes fires the tube 4810 so that the lower winding of a relay 4910 is energized over a circuit including a pair of normally closed contacts 4824. The completion of this circuit operates the relay 4910 to open the contacts 4914, among others. The opening of the contacts 4914 removes ground from the clutch magnet 1204 so that the idler 1503 is shifted to a disengaged position. Thus, rotation of the drive capstan 1607 and movement of the tape 1601 is terminated. The operation of the relay 4910 also clears all of the electronic registers 38 and the computer 39 to insure that any spurious registrations therein are removed to prevent the erroneous storage of information pertaining to the first toll call.

When the resetting operation is completed, a relay 4820 is operated to open the contacts 4824, thereby extinguishing the end-of-call tube 4810 and releasing the relay 4910 so that the contacts 4914 are again closed. The closure of the contacts 4914 forwards grounds to the winding of the clutch magnet 1204 so that the continuous drive for the magnetic tape 1601 in the trunk recorder 25 is rendered effective. The next item of information transmitted by the recorder 25 is a group of mark pulses representing the first stored digit on the tape 1601. This group of mark pulses is applied to the input of the mark pulse amplifiers 31 and 33 and is then applied to the common mark pulse conductor 2080. Incident to the resetting operation performed by the printing control circuit 35, the input of the first digit register in the calling number register is provided with an enabling potential so that only this one digit register is operated by the applied group of mark pulses to store the value of the first digit reproduced from the tape 1601. The registers 38 and the computer 39 preferably comprise counting circuits of cold cathode tubes.

As described above, a space pulse is recorded on the space channel of the tape 1601 immediately following each group of mark pulses. This space pulse is reproduced by the head 1202 and is applied through the space pulse amplifiers 32 and 34 to the space pulse conductor 2070. This first space pulse operates the steering circuit 37 so that the enabling potential is removed from the first counting chain register in the calling number register and is applied to a second digit receiving element or counting chain therein. Thus, the second group of mark pulses reproduced by the mark head 1201 is applied to and stored in the second digit receiving element in the calling number register 38.

In a similar manner, at the conclusion of the transmission of each of the groups of digit representing mark pulses, the transmitted space pulse operates the steering circuit 37 to render the previously effective counting chain ineffective and to render the next succeeding counting chain effective to receive the following group of mark pulses. When all of the stored items of information pertaining to the first toll call have been transmitted, another end-of-call signal is transmitted from the recorder 25 to the end-of-call tube 4810, thereby firing this tube to operate the relay 4910. In operating, the relay 4910 again opens the contacts 4914 to remove ground from the clutch magnet 1204 so that further movement of the tape 1601 is arrested. The data stored in the registers 38 and in the computer 39 is then transferred to the printer 36 by the printing control circuit 35 so that the stored information and the monetary charge established by the computer 39 are printed on a toll ticket. At the completion of this recording operation, the relay 4820 is again operated to open the contacts 4824 so that the tube 4810 is extinguished and the relay 4910 is released to again close the contacts 4914. This starts movement of the magnetic tape 1601 in the seized trunk recorder 25 so that the items of information pertaining to the second toll call are stored in the cleared registers 38 and computer 39.

In response to the completion of the printing of the last tool ticket containing the last item of information stored on the magnetic tape 1601 in the seized recorder 25, the conductor 4945 is grounded so that the clutch magnet 1204 is again energized. The energization of the clutch magnet 1204 advances the magnetic tape 1601 in the seized trunk recorder 25 until such time as the two foil contacts 1206 and 1207 are again sequentially closed to indicate that the end of this tape has been reached.

This sequential operation of the foil contacts 1206 and 1207 produces a corresponding sequential operation of the foil relays 730 and 750 in the seized trunk circuit 19 in the manner described above in detail. Since the playback relay 740 in the seized one-way trunk circuit 19 is now operated, the sequential operation of the foil relays 730 and 750 causes the timed sequential release thereof to transmit a ground pulse to the wiper 1913 over the conductor 773. The application of ground to the wiper 1913 operates the first dismiss relay 1850 over a circuit extending from the grounded battery terminal of this relay through the operating winding thereof and the closed contacts 1912. The operation of the first dismiss relay closes the contacts 1851, 1853, 1854 and 1855 and opens the contacts 1852 and 1856.

The closure of the contacts 1851 completes a holding circuit for the first dismiss relay 1850 which extends through the closed contacts 1831. The opening of the contacts 1856 removes ground from the operating winding of the switch relay 1720, but this relay does not release inasmuch as the concurrent closure of the contacts 1854 applies ground to the operating winding of this relay through the closed contacts 1733 and 1724. The closure of the contacts 1855 completes a circuit for applying ground to the clutch conductor 774 which extends through the closed contacts 1855 and 1862 to the wiper 1745.

The opening of the contacts 1852 breaks the locking circuit for the hunt relay 1710 so that this relay releases to open the contacts 1711, 1715, 1718 and 1719 and to close the contacts 1712, 1713, 1714, 1716 and 1719*a* The opening of the contacts 1718 removes the ground previously applied to the clutch lead 774 from the printing control circuit 35. However, ground is not removed from this conductor inasmuch as the prior closure of the contacts 1855 applies ground to this conductor. The closure of the contacts 1713 applies ground from the closed contacts 1721 to the operating winding of the delay relay 1820 so that this relay is operated to open the contacts 1821 and 1823 and to close the contacts 1822 and 1824. The opening and closing of the remainder of the contacts controlled by the hunt relay 1710 aids in conditioning the playback control circuit 30 for another cycle of operation.

The opening of the contacts 1821 removes ground from the wiper 1825 and, accordingly, from the conductor extending to the printing control circuit 35, thereby to indicate that the data stored in the recorder 25 has been played back. The closure of the contacts 1822 applies ground to the clutch conductor 774, now grounded, through the closed contacts 1725. The opening of the contacts 1823 and the closure of the contacts 1824 aids in conditioning the playback control circuit 30 for an additional cycle of operation.

Referring back to the operation of the first dismiss relay 1850, the closure of the contacts 1853 applies ground through the normally closed contacts 1861 to the cathode of the tube 1880. The closure of the contacts 1853 also initiates the charging of the condenser 1882 through the resistor 1881 so that, after a predetermined time delay, the tube 1880 is rendered conductive to operate the second dismiss relay 1890. The operation of the second dismiss relay 1890 opens the contacts 1891 and 1892.

The opening of the contacts 1892 opens the circuit energizing the two playback relays 1830 and 1910 so that these relays release. The release of the playback relay 1830 opens the contacts 1831, 1832, 1833, 1834 and 1835 and closes the contacts 1836. The opening of the contacts 1831 breaks the operating or locking circuit for the dismiss relay 1850 so that this relay releases to open the contacts 1851, 1853, 1854 and 1855 and to close the contacts 1852 and 1856. The opening of the contacts 1833, in response to the release of the playback relay 1830, interrupts conduction through the tube 1840 and thus releases the playback switch relay 740 in the seized trunk circuit 19. The release of the playback relay 740 conditions the mark pulse head 1201 and the space pulse head 1202 to record signals received from the trunk circuit 19.

The closure and release of the other contacts controlled by the playback relays 1830 and 1910 aid in conditioning the playback circuit 30 to search for and seize another idle trunk circuit and its associated trunk recorder.

The opening of the contacts 1854 removes ground from the operating winding of the switch relay 1720 to release this relay. The opening of the contacts 1855 together with the release of the relay 1720 to open the contacts 1725 removes ground from the clutch conductor 774 so that the movement of the tape 1601 in the seized recorder 25 is terminated. The opening of the contacts 1724 removes ground from the sleeve lead 767 to permit the trunk circuit 19 to be seized.

The opening of the contacts 1853 interrupts conduction through the tube 1880 so that the second dismiss relay 1890 is released. However, the release of the second dismiss relay 1890 and the operation of the other contacts controlled by the dismiss relay 1850 perform no particular function at this time other than to condition the playback circuit 30 for another cycle of operation.

Since the firing of the tube 1880 controls the sequential release of the playback relays 1830 and 1910 and the first dismiss relay 1850, the time delay introduced thereby provides means for insuring that the magnetic tape 1601 is advanced under the control of ground applied to the clutch conductor 774 through a distance such that an adequate length of the tape is advanced beyond the mark and space heads 1201 and 1202 for receiving the date and time information in the event that this tape becomes filled during the next cycle of recording operation. As indicated above, the time delay introduced by the circuit controlling the tube 1840 insures that a playback operation is not started until the portion of tape 1601 following the foil contacts has been advanced past the heads 1201–1203 whereas the time delay introduced by the circuits controlling the tube 1880 insures that an adequate length of the tape 1601 is provided following the closure of the foil contacts 1206 and 1207 at the end of the playback to receive the date and time information pertaining to a forcibly disconnect call.

The closure of the contacts 1856, in response to the release of the dismiss relay 1850, energizes the motor magnet 1740 and the advance relay 1810 in parallel through a circuit extending from ground through the closed contacts 1856, 1760 and 1734 to the operating winding of the advance relay 1810 and through the contacts 1811 to the operating winding of the motor magnet 1740. After a very short time delay, the advance relay 1810 operates to open the contacts 1811 and thus interrupts the operating circuit for the motor magnet 1740 so that this magnet releases to advance the plurality of wipers in the stepping switch to the next adjacent contacts.

The sequential and alternate operation of the hunt-assist relay 1750 and the motor magnet 1740 is now initiated in the manner described above and continues until such time as the wiper 1870 is moved into engagement with a contact in the bank 1870*a* which is not connected to ground through a conductor similar to the conductor 767. When an ungrounded contact is engaged by the wiper 1870, the switch relay 1720 is again operated to terminate the hunting operation.

Thereafter, the sequential operation of the playback control circuit 30 continues in the same manner described above until all of the information in the presently seized trunk recorder, such as the recorder 41, is removed. This sequential operation is continued until such time as the wiper 1870 is returned into engagement with the contact connected to the "dummy" trunk 1872. When the wiper 1870 moves into engagement with the contact to which the "dummy" trunk 1872 is connected, ground is applied from the closed contacts 1812 through the contacts 1724 and 1733, the wiper 1870, the "dummy" trunk 1872, and the closed contacts 1931 to the operating winding of the home relay 1920, thereby operating this relay to open the contacts 1922 and to close the contacts 1921. The opening of the contacts 1922 breaks the locking circuit for the normal start relay 1930 so that this relay releases and the lamp 1965 is extinguished. There is no other ground applied to the operating winding of the normal start relay 1930 at this time inasmuch as ground has previously been removed from the conductor 1960 by the clock and calendar circuit 27.

The release of the normal start relay 1930 opens the contacts 1931, 1932 and 1933. The opening of the contacts 1931 releases the home relay 1920 so that the contacts 1922 are reclosed and the contacts 1921 are opened. The reclosure of the contacts 1922 does not reoperate the normal start relay inasmuch as the contacts 1932 are now open. The opening of the contacts 1933 removes the energization from the drive motor 1510 associated with the plurality of trunk recorders 25 and 41 and also removes the energization from the motor in the printer 36 associated with the printing control circuit 35.

The opening of the contacts 1931, in addition to interrupting the operating circuit of the home relay 1920, places an open circuit on the wiper 1870 associated with the contact bank 1811. Since the wiper 1870 "sees" an open circuit when in engagement with the contact to which the "dummy" trunk 1872 is connected neither the advance relay 1810 nor the hunt-assist relay 1750 is operated to energize the motor magnet 1740. Accordingly, the stepping switch in the playback control circuit 30 remains in this position until it is next placed in operation.

In summary, the playback control circuit 30 searches for and seizes an idle trunk and its associated trunk recorder and retains control over the seized trunk and recorder until such time as all of the items of information stored therein have been removed and transferred to the printing control circuit 35. During this searching and seizing operation, all of the trunk or digit entry circuits that are busy are ignored and the information is not removed from the connected recorders. The playback control circuit 30 further functions to interconnect the mark head 1201 and the space head 1202 of each seized trunk recorder 25 with the printing control circuit 35, the steering circuit 37, and the storage chains 38 so that the recorded information can be utilized.

The playback control circuit 30 controls the movement of the magnetic tape 1601 in the seized trunk recorder 25 until such time as this tape is moved into a position in which further movement thereof results in the transmission of mark and space pulses. At this time, the playback control circuit 30 transfers the control over the clutch magnet 1204 to the printing control circuit 35 so that this circuit, which controls the utilization of the stored information, is able to control the time sequence in which information is supplied from the trunk recorder 25 to the printing control circuit 35 and the printer 36.

*Emergency operation of the playback control circuit 30*

Under emergency operating conditions, the playback control circuit 30 is notified of the fact that a trunk recorder 25 associated with one of the trunk circuits 19 has become filled with the items of information pertaining to toll calls and that this particular recorder 25 is now unable to accept additional information. This means that the trunk circuit associated with this trunk recorder is also busy and is incapable of completing additional toll calls. In order to prevent the trunk circuit associated with a filled trunk recorder 25 from being out of service for an undue length of time, means are provided whereby the playback control circuit 30 searches for and seizes a filled trunk recorder 25 upon the receipt of information from this trunk recorder that it is no longer able to accept additional information. The playback control circuit 30 can be placed into operation in response to the receipt of emergency start information when the wiper 1870 occupies the home position in which this wiper is in engagement with the contact to which the "dummy" trunk 1872 is connected, or the cycle of operation can be initiated immediately following the completion of a normal playback operation if, at the time the emergency start information is received by the playback control circuit, this circuit is engaged in removing information from a seized recorder 25.

Assuming that the playback control circuit 30 is in a normal condition, the trunk circuit 19, in response to the receipt of information that its connected trunk recorder 25 is filled with stored data, places ground on the start lead 30*a* which is common to all of the trunk circuits. The ground on the conductor 30*a* is coupled to the lower operating winding of the normal start relay 1930 through a conductor 1770 and a pair of normally closed contacts 1955. The application of ground to the winding of the normal start relay 1930 operates this relay to close the contacts 1931, 1932, and 1933. The closure of these contacts initiates a cycle of operation similar to the described when the normal start relay 1930 is operated under the control of ground applied thereto from the clock-calendar circuit 27. This sequential operation includes the operation of the first dismiss relay 1850, the operation of the second dismiss relay 1890, and the subsequent release of both of these relays.

In response to the release of the dismiss relay 1850, the motor magnet 1740 and the advance relay 1810 are energized in parallel, and thereafter, the operation of the advance relay 1810 to open the contacts 1811 interrupts the energization of the motor magnet 1740 so that the stepping switch is advanced a single step. Simultaneously therewith, the switch relay 1720 is released by the opening of the contacts 1854 to remove locking ground from the operating winding of this relay.

When the relay 1720 is released, the contacts 1721, 1724, 1725 and 1726 are opened and the contacts 1722 and 1723 are closed. The closure of the contacts 1722 connects the ground on the start lead 30*a* to the operating winding of an emergency start relay 1730 to operate this relay. The operation of the relay 1730 closes a pair of contacts 1731 and 1732 and opens the contacts 1733 and 1734. The opening of the contacts 1733 prevents the operation of the hunt-assist relay 1750 and, consequently, the motor magnet 1740 under the control of the wiper 1870. The opening of the contacts 1734 prevents the operation of the advance relay 1810 so that the motor magnet 1740 cannot be operated either by the advance relay 1810, and consequently, by the dismiss relay 1850, or by the wiper 1870 which may encounter contacts which are not grounded in moving away from the contact to which the "dummy" trunk 1872 is connected.

The closure of the contacts 1731 connects ground to the operating winding of the delay relay 1820 so that this relay is operated even though the switch relay 1720 is released. The closure of the contacts 1732 connects the operating winding of the hunt-assist relay 1750 to ground so that this relay is operated. The operating circuit for the relay 1750 extends from the normally closed and grounded contacts 1852 through the closed contacts 1712, 1732, 1741 and 1751. The operation of the relay 1750 closes the contacts 1752 and opens the contacts 1751.

The closure of the contacts 1752 energizes the motor magnet 1740 so that this magnet operates to open the contacts 1741 to release the hunt-assist relay 1750. This alternate and sequential operation of the hunt-assist relay 1750 and the motor magnet 1740 continues until such time as the plurality of wipers are moved into engagement with the contacts connected to the trunk circuit 19 to which is connected the trunk recorder 25 having a completely filled magnetic tape 1601.

As explained above in the detailed description of the operation of the trunk circuit 19 under emergency start conditions, the conductor 771 is provided with grounded battery at the same time that ground is applied to the emergency start conductor 30*a*. Therefore, when the stepping switch moves the plurality of wipers controlled thereby into engagement with the contacts connected to the circuit 19, the wiper 1742 engages the contact to which is connected the conductor 771. Grounded battery from this conductor is applied through the normally closed contacts 1719*a* to the upper operating winding of the hunt relay 1710. This operates the relay 1710 to close the contacts 1711, 1715, 1718, and 1719 and to open the contacts 1712, 1713, 1714, 1716 and 1719*a*.

The opening of the contacts 1714 interrupts the operating circuit for the emergency start relay 1730 so that this relay releases to close the contacts 1733 and 1734 and to open the contacts 1731 and 1732. The opening of the contacts 1731 interrupts the operating circuit for the delay relay 1820 so that this relay releases to close the contacts 1821 and 1823, and to open the contacts 1822 and 1824. The opening of the contacts 1732 interrupts the operating circuit for the hunt-assist relay 1750 so that this relay no longer operates to periodically operate the motor magnet 1740.

The closing and the opening of the remainder of the contacts controlled by the hunt relay 1710 perform the same functions described above during the normal operation of the playback control circuit 30. Therefore, the playback control circuit 30 transfers the control of the clutch magnet 1204 to the printing control circuit 35, grounds one of the conductors 1826 and 1827 to identify the seized storage unit or recorder 25, and connects the mark head 1201 and the space head 1202 to the amplifiers 31–34. The trunk recorder 25 is then operated to transmit the items of information stored therein to the storage chains 38 under the control of the steering circuit 37. This operation continues until such time as the magnetic tape 1601 in the seized trunk recorder 25 is advanced to place the stored items of information pertaining to the last toll call adjacent the heads 1201–1203.

Normally, the end-of-call signal following the last group of mark pulses is recorded on the magnetic tape 1601 in a position spaced forwardly from the conductive spots or foils which form the contacts 1206 and 1207. However, since this cycle of operation of the circuit 30 is started under the control of the emergency start circuit, the groups of pulses representing the date and time of the termination of the last call recorded on the filled magnetic tape 1601 are positioned rearwardly from the foil element forming a part of the second foil contacts 1207. This end-of-call signal indicates that all of the items of information pertaining to the forcibly disconnected call have been recorded in the associated trunk recorder 25.

Under normal operating conditions, the end-of-call code pertaining to the last toll call recorded on the magnetic tape 1601 in an unfilled recorder 25 is transmitted to the printing control circuit 35 before the first foil contacts 1206 are closed. However, the end-of-call code in a filled recorder 25 is not transmitted to the printing control circuit 35 until after both of the contacts 1206 and 1207 have been sequentially closed, thus indicating that the end of the magnetic tape 1601 in the seized recorder 25 has been advanced to a sensing position adjacent the mark head 1201 and the space head 1202. The sequential closing of the foil contacts 1206 and 1207 sequentially operates and releases the foil relays 730 and 750 in the manner described above. The sequential release of these two relays, thus indicating that the end of the magnetic tape 1601 has passed the sensing position, produces a ground pulse which is applied through the conductor 773, the wiper 1930, and the closed contacts 1912 to operate the first dismiss relay 1850.

The operation of the first dismiss relay 1850, to close the contacts 1851, 1853, 1854 and 1855 and to open the contacts 1852 and 1856, produces the same operations described above following the subtitle, Normal Operation of the Playback Control Circuit 30, with the exception that the closure of the contacts 1853 does not immediately initiate conduction in the tube 1880 which controls the second dismiss relay 1890. The closure of the contacts 1853 does not produce the immediate firing of the tube 1880 because the transmission of the end-of-call code to the printing control circuit 35 under emergency start conditions occurs following the transmission of the ground pulse which operates the first dismiss relay 1850. As explained above, this end-of-call code is transmitted to the printing control circuit 35 after the tape 1601 has been advanced through the distance necessary to transmit the date and time data pertaining to the last call. This end-of-call signal actuates the circuit 35 to apply ground to a conductor 4915 so that an end-of-call relay 1860 is operated to open the contacts 1861 and 1862.

The opening of the contacts 1862 removes the only source of ground from the clutch lead 774 since the prior release of the hunt relay 1710 in response to the operation of the dismiss relay 1850 opens the contacts 1718, the switch relay 1720 also being released. The removal of ground from the clutch conductor 774 releases the clutch magnet 1204 in the seized trunk recorder 25 so that the magnetic tape 1601 is not advanced beyond the position at which the end-of-call code is transmitted to the printing control circuit 35.

The opening of the contacts 1861 prevents further charging of the condenser 1882 and disconnects the cathode of the tube 1880 from ground so that this tube can not be rendered conductive. After a predetermined period of time controlled by the printing control circuit 35, the end-of-call relay 1860 is released to indicate that the items of information relating to the last toll call have been printed. The release of the relay 1860 closes the contacts 1861 and 1862 to reinitiate the operation of the clutch magnet 1204 so that the tape 1601 is again advanced in the seized recorder 25. The closure of the contacts 1861 reestablishes a conductive path to the cathode of the tube 1880 and reinitiates the charging of the partially charged condenser 1882 through the resistance 1881. After the expiration of a period of time sufficient for the tape 1601 in the seized recorder 25 to be advanced to its normal or home position, the tube 1880 fires to operate the second dismiss relay 1890. The operation of the relay 1890 opens the contacts 1891 and 1892 to initiate the release of the seized recorder 25, including the removal of ground from the clutch conductor 774 to stop the movement of the tape 1601.

Accordingly, the operation of the end-of-call relay 1860 during a cycle of operation initiated by the application of ground to the emergency start conductor 30*a* interrupts the charging path for the condenser controlling the tube 1880 so that this tube cannot be rendered conductive in response to the operation of the dismiss relay 1850 when the end of the magnetic tape 1601 is reached. The opening of the contacts 1861 prevents the playback control circuit 30 from dismissing the seized and previously filled recorder 25 until such time as a toll ticket has been produced by the printer 36 containing the items of information relating to the last toll call. Following the production of the toll ticket, the magnetic tape 1601 is moved to the same position relative to the mark head 1201 and the space head 1202 as at the termination of normal playback operation.

The opening of the contacts 1892 releases the serially operated playback relays 1830 and 1910 so that the first playback relay 1830, in releasing, opens the contacts 1831 to remove locking ground from the winding of the first dismiss relay 1850. The dismiss relay 1850 then releases to open the contacts 1851, 1853, 1854 and 1855 and to close the contacts 1852 and 1856. The closure of the contacts 1856 operates the advance relay 1810 and the motor magnet 1740 in parallel so that, after the short interval of time required to open the contacts 1811, the motor magnet 1740 is released and advances the wipers to the next adjacent contacts. The operation of the advance relay 1810 also closes the contacts 1812, 1813 and 1814.

However, the switch relay 1720 is not operated in response to the operation of the advance relay 1810 inasmuch as the simultaneous operation of the advance relay 1810 and the release of the motor magnet 1740 advances the plurality of wipers to the next adjacent contacts. If the wiper 1870 engages a pair of grounded contacts, the hunt-assist relay 1750 is operated to energize the motor magnet 1740. The operation of the motor magnet 1740 opens the contacts 1741 so that the alternate operation of the hunt-assist relay 1750 and the motor magnet 1740 advances the plurality of wipers including the test wiper 1872 to the normal home position in which all of the wipers except the wiper 1870 engage open contacts and in which the wiper 1870 engages the contact connected to the "dummy" trunk 1872 to operate the home relay 1920. The operation of the home relay 1920 interrupts the locking circuit for the normal start relay 1930, and this relay releases to prevent further operation of the stepping switch. The release of the normal start relay 1930 also opens the contacts 1932 and 1933 so that the relay 1920 is released and the drive motor 1510 is released. Opening the contacts 1931 also removes the ground shunt around the operating winding of the switch relay 1720 so that this relay operates to close the contacts 1721, 1724, 1725 and 1726 and to open the contacts 1722 and 1723. The closure of the contacts 1721 reoperates the delay relay 1820 to close the contacts 1822 and 1824 and to open the contacts 1821 and 1823.

Accordingly, at the conclusion of an emergency playback operation, the playback control circuit 30 is conditioned for operation under the control of either of the clock and calendar circuit 27 or the emergency start conductor 30*a*. In this condition, the switch relay 1720, the delay relay 1820, and the advance relay 1810 are all operated. It should be noted that when an emergency start takes place in the playback control circuit 30, this circuit searches for and seizes any trunk circuits connected to contacts of the stepping switch following the contact connected to the trunk circuit having the filled recorder 25.

*Manually initiated operation of the playback control circuit 30*

To manually start the playback control circuit 30, a switch including a pair of elements 1963*a* and 1963*b* is provided. When this switch is operated, the element 1963*a* completes the circuit for operating the motor in the printer 36 and the common drive motor 1510. The switch element 1963*b* operates the normal start relay 1930 to produce the operation of the playback control circuit 30, described above.

*Alarm facilities in the playback control circuit 30*

The playback control circuit 30 is provided with a pair of relays 1940 and 1950 for indicating that either the printing control circuit 35 or the playback control circuit 30 is not operating properly. This alarm is of major importance because the magnetic tape 1601 in the seized trunk recorder 25 is erased during a playback operation, and, if tickets are not produced in response to the first playback from the magnetic tape 1601, this information is permanently lost. To provide this alarm, an incomplete call relay 1940 is operated under the control of the circuit 35 by the application of ground to a conductor 1956 which is extended to the circuit 30 over the cable 1885. The relay 1940 is operated to close a plurality of contacts 1941 and 1942 as each of the recorders 25 and 41 is seized. The closure of the contacts 1941 interconnects the operating winding of the incomplete call relay 1940 with a conductor 1943 which extends to the printing control circuit 35 through the cable 1885. This conductor is normally grounded and remains grounded until such time as the printing control circuit 35 indicates that all of the information necessary to process at least one complete toll ticket has been received. At this time, ground is removed from the conductor 1943 so that the locking circuit for the incomplete call relay 1940 is broken. Thus, if adequate data is provided, this relay releases to open the plurality of contacts 1941 and 1942.

However, if the printing control circuit 35 does not receive adequate information for producing a single complete toll ticket during the playback of an entire tape 1601, ground remains on the conductor 1943 so that the incomplete call relay 1940 remains operated. Thus, when the hunt relay 1710 is released in response to dismissing a seized trunk circuit 19 and its associated recorder 25 at the completion of the playback of the information stored on the magnetic tape 1601, ground is applied through the closed contacts 1721, 1713 and 1942 to the operating winding of an alarm relay 1950. This relay is operated to open a plurality of contacts 1951, 1954 and 1955 and to close a plurality of contacts 1952 and 1953.

The closure of the contacts 1952 completes a locking circuit for the alarm relay 1950 so that this relay remains operated. The opening of the contacts 1951 disconnects the incomplete call relay 1940 from the printing control circuit 35. The closure of the contacts 1953 energizes a major alarm, either of the visible or audible type, to indicate that the preceding playback operation of a seized trunk recorder failed to produce a single complete toll ticket, and thus indicates to the supervisory personnel that the toll ticketing facilities are operating improperly.

The opening of the plurality of contacts 1954 and 1955 breaks the operating circuit for both of the windings of the normal start relay 1930 so that this relay cannot be operated. By opening the operating circuits of the normal start relay 1930, it is impossible to initiate another cycle of operation of the playback control circuit 30 and thus, the toll ticketing facilities are rendered inoperative.

In summary, the data handling system of the present invention provides means by which an idle one of a plurality of magnetic storage units and its connected digit entry means is selectively seized by signal responsive means so that digit representing signals are stored in the magnetic storage device either under the control of previously registered information or under the control of manually actuated selecting means. The plurality of magnetic storage units are selectively seized in accordance with their idle or busy condition by common control means so that the digital information stored in the magnetic storage units can be reproduced and selectively applied to a plurality of digit receiving elements or registers under the control of signals reproduced from the storage units.

Although the present invention has been described in conjunction with a single embodiment thereof, it will be understood that various other modifications and embodiments may be devised by those skilled in the art which will fall within the spirit and scope of the principles of this invention.

What is claimed as new and desired to be secured by Letters Patent of the United States is:

1. A data handling system comprising a plurality of magnetic storage units each including a magnetic member, transducing means disposed adjacent the member, and drive means for moving the member relative to the transducing means; a plurality of control circuits each connected to one of said storage units, each of said control circuits including means for supplying digit representing signals to the transducing means for storage on the member and means for operating the drive means during the storage of said signals, each of said control circuits also including means for marking the connected storage unit as busy or idle; digit utilizing means; selecting means controlled by the idle or busy conditions of said storage units for connecting only an idle selected one of said storage units to said utilizing means; means controlled by the connection of a selected one of said storage units to said utilizing means for operating the drive means in said selected storage unit to move a selected portion of the magnetic member therein adjacent the transducing means; and control means operated following the completion of this movement of the member for connecting the transducing means in the selected storage unit to said utilizing means.

2. The data handling system set forth in claim 1 in which each of said storage units includes a normally ineffective erasing means disposed adjacent the magnetic member, and in which said control means includes means for rendering the erasing means in an idle selected one of said storage units effective following the movement of said selected portion of said magnetic member to a position adjacent said transducing means.

3. A data handling system comprising a plurality of magnetic recorder units each including a magnetic member, step drive means for moving the member step-by-step, continuous drive means for moving the member continuously, and transducing means disposed adjacent the member; a plurality of pulse generating circuits, each of said pulse generating circuits being connected to one of the magnetic recorder units and including both means for supplying signals to said transducing means for storage on said member and means for operating said step drive in synchronism with the signals supplied to said transducing means; a signal utilizing means common to said plurality of magnetic recorder units; and a control circuit including switching means for seizing a selected one of said recorder units and for connecting the seized recorder unit to said signal utilizing means, said control circuit including means for conditioning the transducing means in said seized recorder unit to reproduce the signals stored on the magnetic member and for operating the continuous drive means to move the member so that the stored signals are transmitted to said signal utilizing means.

4. A data handling system comprising a magnetic recorder unit including a magnetic member for storing digital data, step drive means for moving said member step-by-step, continuous drive means for moving said member continuously, and transducing means disposed adjacent said member; digit selecting means; digit entry means controlled by said digit selecting means for supplying a series of signals representing the value of a selected digit to said transducing means for recording on said member and for supplying a similar series of pulses to said step drive means to move said member a step incident to the recording of each pulse on said member; means included in said digit entry means for supplying a control signal to said transducing means for storage on said member at the conclusion of the series of signals representing the selected digit; digit utilizing means; control means for rendering said utilizing means responsive to signals reproduced from said member by said transducing means; means included in said control means for operating said continuous drive means to continuously move said member relative to said transducing means so that said utilizing means is operated by said signals representing the value of the selected digit; and means controlled by the reproduced control signal for rendering said utilizing means ineffective to receive additional signals.

5. A data handling system comprising a magnetic data storage unit including a magnetic member, transducing means disposed adjacent the member, and drive means for moving said member relative to said transducing means; entry means connected to said storage unit for supplying data representing signals to said transducing means and for operating said drive means to move said member relative to said transducing means only during the interval in which signals are being supplied to said transducing means; data utilizing means for receiving signals reproduced from said member; connecting means for connecting said storage unit to said data utilizing means; and control means automatically operable in response to the movement of a predetermined amount of said member past said transducing means for operating said connecting means to connect said data utilizing means to said storage means.

6. The data handling system set forth in claim 5 in which said control means includes means for rendering said entry means ineffective when said predetermined amount of said member has been moved past said transducing means.

References Cited by the Examiner

UNITED STATES PATENTS

| | | | |
|---|---|---|---|
| 2,636,672 | 4/1953 | Hamilton et al. | 340—172.5 |
| 2,764,634 | 9/1956 | Brooks et al. | 340—174 |
| 2,767,246 | 10/1956 | Retallack | 179—7.1 |
| 2,851,676 | 9/1958 | Woodcock et al. | 340—174 |
| 2,901,734 | 8/1959 | Welsh et al. | 340—174.1 |

IRVING L. SRAGOW, *Primary Examiner.*

EVERETT R. REYNOLDS, *Examiner.*